(12) United States Patent
Toohey et al.

(10) Patent No.: US 8,920,879 B2
(45) Date of Patent: Dec. 30, 2014

(54) SELF-HEALING MATERIALS WITH MICROFLUIDIC NETWORKS

(75) Inventors: Kathleen S. Toohey, Urbana, IL (US);
Nancy R. Sottos, Champaign, IL (US);
Jennifer A. Lewis, Urbana, IL (US);
Jeffrey S. Moore, Savoy, IL (US); Scott R. White, Champaign, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 1892 days.

(21) Appl. No.: 11/760,517

(22) Filed: Jun. 8, 2007

(65) Prior Publication Data
US 2008/0305343 A1 Dec. 11, 2008

(51) Int. Cl.
*B05D 3/02* (2006.01)
*B29C 73/22* (2006.01)
*B29C 73/16* (2006.01)

(52) U.S. Cl.
CPC .............. *B29C 73/22* (2013.01); *B29C 73/163* (2013.01)
USPC ....................................... 427/384; 427/385.5

(58) Field of Classification Search
USPC ...................................................... 427/385.5
See application file for complete search history.

(56) References Cited

U.S. PATENT DOCUMENTS

| | | | |
|---|---|---|---|
| 6,027,326 A | 2/2000 | Cesarano, III et al. | |
| 6,306,520 B1 * | 10/2001 | Nagata et al. | 428/520 |
| 6,518,330 B2 | 2/2003 | White et al. | |
| 6,858,659 B2 | 2/2005 | White et al. | |
| 7,566,747 B2 | 7/2009 | Moore et al. | |
| 7,569,625 B2 | 8/2009 | Keller et al. | |
| 7,612,152 B2 | 11/2009 | Braun et al. | |
| 7,723,405 B2 | 5/2010 | Braun et al. | |
| 2002/0098124 A1 * | 7/2002 | Bentsen et al. | 422/100 |
| 2004/0226620 A1 | 11/2004 | Therriault et al. | |
| 2006/0111469 A1 | 5/2006 | White et al. | |
| 2008/0299391 A1 | 12/2008 | White et al. | |

FOREIGN PATENT DOCUMENTS

| | | | |
|---|---|---|---|
| WO | WO 2004092048 A1 * | 10/2004 | B81B 1/00 |
| WO | 2007005657 | 1/2007 | |

OTHER PUBLICATIONS

Smay, J. E., et al., "Colloidal Inks for Directed Assembly of 3-D Periodic Structures", "Langmuir", 2002, pp. 5429-5437, vol. 18.
Trask, et al., "Self-healing polymer composites: mimicking nature to enhance performance", "Bioinsp. Biomim.", 2007, pp. P1-P9, vol. 2.
International Searching Authority, "International Search Report for PCT/US2008/066071", May 4, 2009, Publisher: European Patent Office, Published in: EP.

* cited by examiner

*Primary Examiner* — Robert S Walters, Jr.
(74) *Attorney, Agent, or Firm* — Blanchard & Associates

(57) ABSTRACT

A method of making a composite material provides a composite material that includes a polymeric layer and a substrate, in contact with the polymeric layer, where the substrate includes a substrate matrix, a first microfluidic network in the substrate matrix and in fluid communication with the polymeric layer, and a polymerizer in the first microfluidic network. The method includes forming the first microfluidic network in the substrate matrix, where the first microfluidic network is in fluid communication with a surface of the substrate matrix. The method further includes contacting the surface of the substrate matrix with the polymeric layer, and placing the polymerizer in the first microfluidic network.

5 Claims, 8 Drawing Sheets

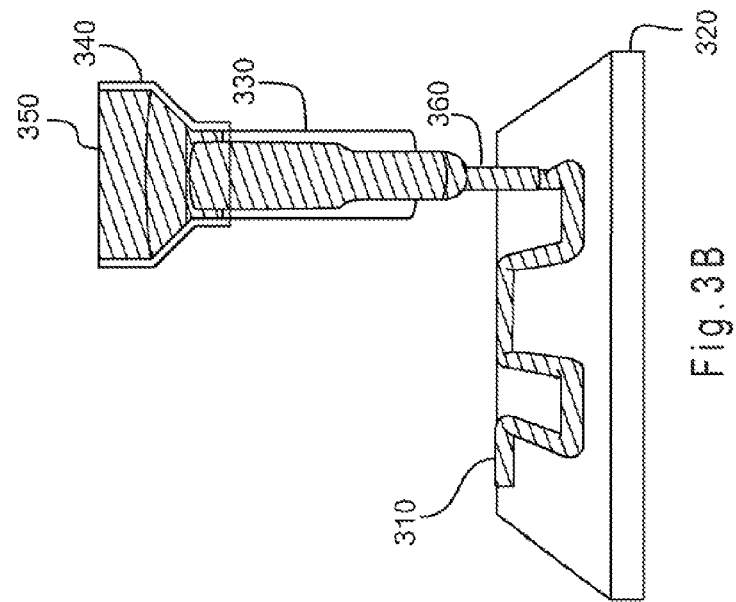
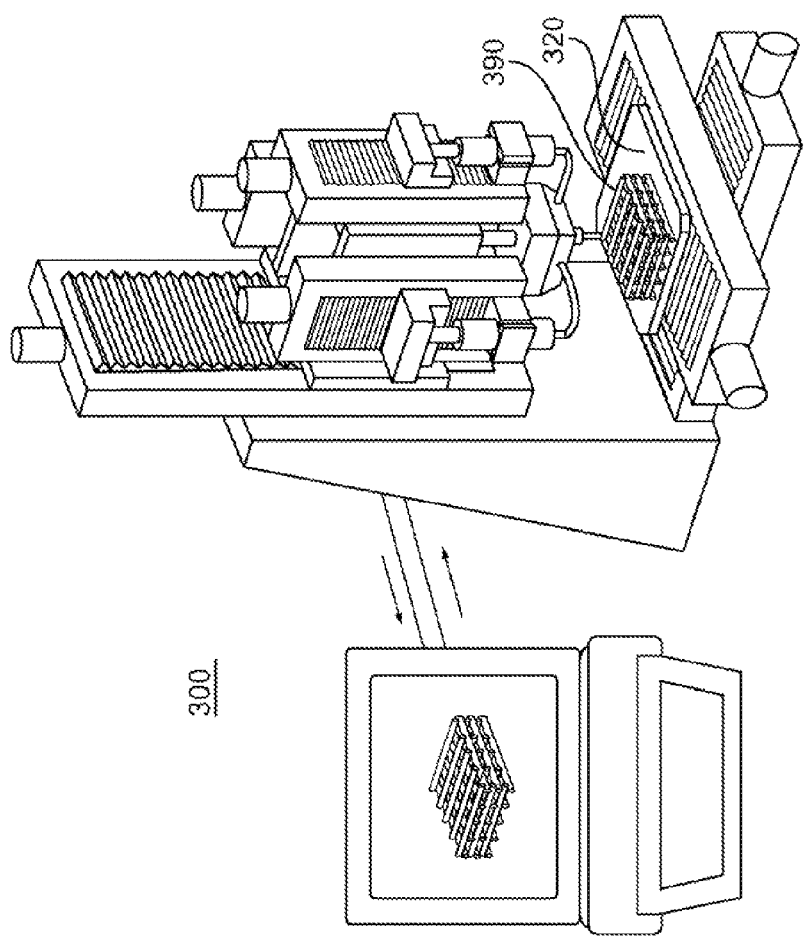

SELF-HEALING MATERIALS WITH MICROFLUIDIC NETWORKS

FEDERALLY SPONSORED RESEARCH OR DEVELOPMENT

The subject matter of this application may have been funded in part under a research grant from the Air Force Office of Scientific Research under grant number F49550-05-1-0346. The U.S. Government may have rights in this invention.

BACKGROUND

Cracks that form within materials can be difficult to detect and almost impossible to repair. A successful method of autonomically repairing cracks that has the potential for significantly increasing the longevity of materials has been described, for example, in U.S. Pat. No. 6,518,330. This self-healing system includes a material containing, for example, solid particles of Grubbs catalyst and capsules containing liquid dicyclopentadiene (DCPD) embedded in an epoxy matrix. When a crack propagates through the material, it ruptures the microcapsules and releases DCPD into the crack plane. The DCPD then mixes with the Grubbs catalyst, undergoes Ring Opening Metathesis Polymerization (ROMP), and cures to provide structural continuity where the crack had been.

Crack formation in coatings can be especially problematic, since coatings are often present to protect the substrate onto which they have been coated. For example, metal substrates may be coated with a layer of material to prevent or inhibit corrosion of the metal. A crack in such a coating typically leads to corrosion of the underlying metal, resulting in expensive and wasteful repair or replacement of some or all of a part made from the metal. To ensure the integrity of the metal, it may be necessary to replace the coating periodically, regardless of whether cracks actually have formed. Coatings also may be used in the form of primers, paints, stains, sealers and topcoats. Substrates for these coatings include building materials, windows, electronics, automotive parts, marine parts and aerospace parts. These coatings may protect the underlying material from corrosion, moisture, bacterial growth, ultraviolet radiation and/or mechanical impact.

Self-healing materials typically are limited to autonomic repair of a single damage event in a given location. When self-healing is triggered by crack-induced rupture of embedded capsules, once a localized region is depleted of healing agent there can be no further repair. Re-mendable polymers can achieve multiple healing cycles, but typically require external intervention in the form of heat treatment and applied pressure. See, for example, Chen (2002) and Chen (2003).

It is desirable to provide a material that can self-heal when subjected to a crack multiple times in the same location. It is also desirable to provide a material that can function as a coating and that can self-heal to maintain the protection of the substrate from the surrounding environment.

SUMMARY

In one aspect, the invention provides a composite material including a polymeric layer and a substrate, in contact with the polymeric layer. The substrate includes a substrate matrix, a first microfluidic network in the substrate matrix and in fluid communication with the polymeric layer, and a polymerizer in the first microfluidic network.

In another aspect, the invention provides a method of making the composite material including forming the first microfluidic network in the substrate matrix, where the first microfluidic network is in fluid communication with a surface of the substrate matrix. The method further includes contacting the surface of the substrate matrix with the polymeric layer, and placing the polymerizer in the first microfluidic network.

In yet another aspect, the invention provides a method of making a composite material including applying a first fugitive material to a surface to form a first scaffold, applying a matrix precursor to the surface, solidifying the matrix precursor to form a substrate matrix, removing at least a portion of the first fugitive material from the substrate matrix to form a first network, contacting a surface of the substrate matrix with a polymeric layer, and placing a polymerizer in the first network. The first scaffold includes substantially tubular filaments of the first fugitive material, and the filaments have an average diameter of from 0.1 to 1000 micrometers. The substrate matrix encapsulates at least a portion of the first scaffold. The first network includes substantially tubular channels in the substrate matrix, and the first network is in fluid communication with the surface of the substrate matrix.

The following definitions are included to provide a clear and consistent understanding of the specification and claims.

The term "polymeric" means a substance that includes a polymer.

The term "polymer" means a substance containing more than 100 repeat units. The term "polymer" includes soluble and/or fusible molecules having long chains of repeat units, and also includes insoluble and infusible networks. The term "prepolymer" means a substance containing less than 100 repeat units and that can undergo further reaction to form a polymer.

The term "matrix" means a continuous phase in a material.

The term "matrix precursor" means a composition that will form a matrix when it is solidified. A matrix precursor may include a monomer and/or prepolymer that can polymerize to form a polymer matrix. A matrix precursor may include a polymer that is dissolved or dispersed in a solvent, and that can form a polymer matrix when the solvent is removed. A matrix precursor may include a polymer at a temperature above its melt temperature, and that can form a polymer matrix when cooled to a temperature below its melt temperature. A matrix precursor may include fine flowing particles that can be converted into a larger, non-flowable mass.

The term "microfluidic network" means a plurality of channels having a plurality of interconnects, where at least a portion the channels have a dimension less than 500 micrometers.

The term "fluid communication" means that two objects are in an orientation, and within a sufficient proximity to each other, such that fluid can flow from one object to the other. The term "fluid" means a substance in the liquid or gaseous state. In one example, if a microfluidic channel embedded in a matrix is in fluid communication with a surface of the matrix, then fluid can flow from the channel onto the surface. In another example, if a microfluidic channel is in fluid communication with a surface of another material, then fluid in the channel can contact the surface and can flow into a crack that may form in the material.

The term "polymerizer" means a composition that will form a polymer when it comes into contact with a corresponding activator for the polymerizer. Examples of polymerizers include monomers of polymers, such as styrene, ethylene, acrylates, methacrylates and dicyclopentadiene (DCPD); one or more monomers of a multi-monomer polymer system, such as diols, diamines and epoxides; prepolymers such as partially polymerized monomers still capable of further polymerization; and functionalized polymers capable of forming larger polymers or networks.

The term "activator" means anything that, when contacted or mixed with a polymerizer, will form a polymer. Examples of activators include catalysts and initiators. A corresponding activator for a polymerizer is an activator that, when contacted or mixed with that specific polymerizer, will form a polymer.

The term "catalyst" means a compound or moiety that will cause a polymerizable composition to polymerize, and that is not always consumed each time it causes polymerization. This is in contrast to initiators, which are always consumed at the time they cause polymerization. Examples of catalysts include ring opening polymerization (ROMP) catalysts such as Grubbs catalyst. Examples of catalysts also include silanol condensation catalysts such as titanates and dialkyltincarboxylates. A corresponding catalyst for a polymerizer is a catalyst that, when contacted or mixed with that specific polymerizer, will form a polymer.

The term "initiator" means a compound or moiety that will cause a polymerizable composition to polymerize and, in contrast to a catalyst, is always consumed at the time it causes polymerization. Examples of initiators include peroxides, which can form a radical to cause polymerization of an unsaturated monomer; a monomer of a multi-monomer polymer system, such as a diol, a diamine, and an epoxide; and amines, which can form a polymer with an epoxide. A corresponding initiator for a polymerizer is an initiator that, when contacted or mixed with that specific polymerizer, will form a polymer.

The term "capsule" means a closed object having an aspect ratio of 1:1 to 1:10, and that may contain a solid, liquid, gas, or combinations thereof. The aspect ratio of an object is the ratio of the shortest axis to the longest axis, where these axes need not be perpendicular. A capsule may have any shape that falls within this aspect ratio, such as a sphere, a toroid, or an irregular amoeboid shape. The surface of a capsule may have any texture, for example rough or smooth. Capsules may be hollow, or they may be solid particles.

The term "encapsulant" means a material that will dissolve or swell in a polymerizer and, when combined with an activator, will protect the activator from reaction with materials used to form a polymer. A corresponding encapsulant for a polymer and for a polymerizer will protect an activator from reaction with materials used to form that specific polymer and will dissolve or swell in that specific polymerizer. An encapsulant may be formed into particles in the shape of a capsule.

BRIEF DESCRIPTION OF THE DRAWINGS

The invention can be better understood with reference to the following drawings and description. The components in the figures are not necessarily to scale, emphasis instead being placed upon illustrating the principles of the invention.

FIGS. 3A and 3B represent a robotically controlled deposition machine (RCD) forming a scaffold of a fugitive material on a surface.

DETAILED DESCRIPTION

The present invention makes use of the discovery that a material can autonomically self-heal when in contact with a microfluidic network that can deliver a polymerizer to a crack in the material. When a crack forms in the material, the polymerizer flows from the microfluidic network into the crack and is exposed to an activator. Contact between the polymerizer and the activator forms a polymer, repairing the crack. The activator may be present in the material to be healed, or the activator may be supplied by a second microfluidic network.

Figure 1:
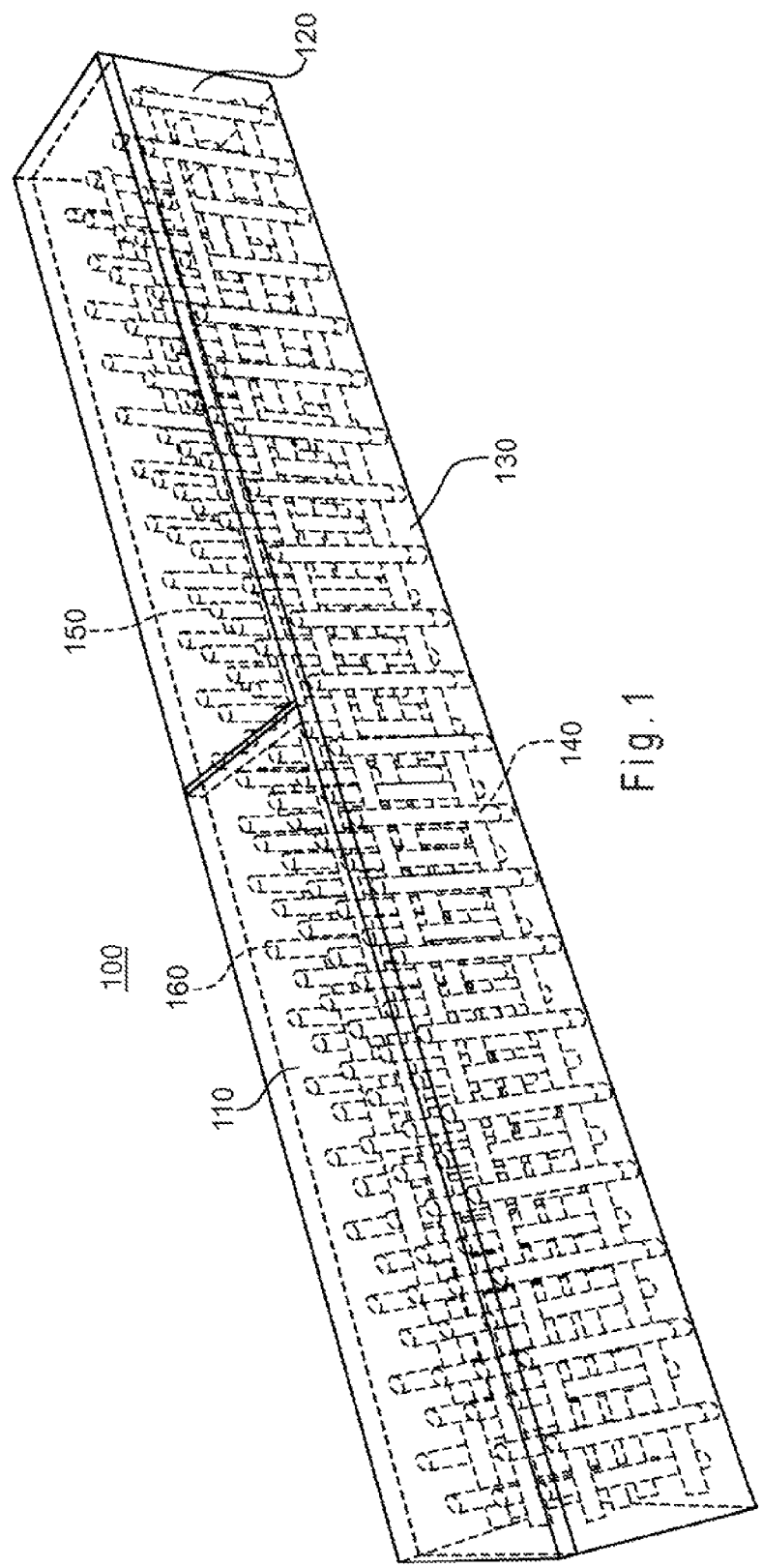
FIG. 1 represents a composite material having a polymeric layer and a substrate, where the substrate includes a microfluidic network.

FIG. 1 represents an example of a composite material 100, including a polymeric layer 110 and a substrate 120 in contact with the polymeric layer. The substrate 120 includes a substrate matrix 130, a first microfluidic network 140 in the substrate matrix, and a polymerizer in the first microfluidic network. The first microfluidic network 140 is in fluid communication with the polymeric layer 110. The substrate 120 optionally may include a second microfluidic network 150 in fluid communication with the polymeric layer 110, and an activator in the second microfluidic network. The substrate 120 optionally may include one or more additional microfluidic networks 160, which may be in fluid communication with the polymeric layer 110. An optional additional network 160 may contain the polymerizer, an activator, or a substance other than the polymerizer and the activator.

The polymeric layer 110 may include any polymer that can be applied to a substrate. Examples of polymers include polyamides such as nylons; polyesters such as poly(ethylene terephthalate) and polycaprolactone; polycarbonates; polyethers; epoxy polymers; epoxy vinyl ester polymers; polyimides such as polypyromellitimide (for example KAPTAN); phenol-formaldehyde polymers (for example BAKELITE); amine-formaldehyde polymers such as a melamine polymer; polysulfones; poly(acrylonitrile-butadiene-styrene) (ABS); polyurethanes; polyolefins such as polyethylene, polystyrene, polyacrylonitrile, polyvinyls, polyvinyl chloride and poly(DCPD); polyacrylates such as poly(ethyl acrylate); poly(alkylacrylates) such as poly(methyl methacrylate); polysilanes such as poly(carborane-siloxane); and polyphosphazenes. The polymeric layer can include other ingredients in addition to the polymer. For example, the layer can contain stabilizers, antioxidants, flame retardants, plasticizers, colorants and dyes, fragrances, particulate fillers, reinforcing fibers, and adhesion promoters.

The polymeric layer may include one or more adhesion promoters. One type of adhesion promoter that may be present includes substances that promote adhesion between the polymeric layer and the polymer formed from the polymerizer when contacted with the activator. This adhesion may influence whether the polymeric layer can be healed once a crack has been introduced. To promote the adhesion between the polymeric layer and the polymer formed in the crack, various unsaturated silane coupling agents may be used. Typically, these are compounds of the formula $R^2$—$SiX'X''X'''$, where $R^2$ is preferably an unsaturated group $R^3$ separated by a propylene group from silicon; and X', X'' and X''' are independently alkyl or alkoxy, such that at least one of X', X'' and X''' is an alkoxy group (preferably ethoxy). Examples of compounds of this formula include $R^3$—$CH_2CH_2CH_2Si(OCH_2CH_3)_3$. Specific examples include silane coupling agents available from GELEST, such as (3-acryloxypropyl)-trimethoxysilane, (3-acryloxypropyl)methyldimethoxysilane, methacryloxypropyl-trimethoxysilane, methacryloxypropylmethyldimethoxysilane, methacryloxypropyl-triethoxysilane, methacryloxypropylmethyldiethoxysilane, 3-glycidoxypropyl-trimethoxysilane, and N-2-aminoethyl-3-aminopropyl-trimethoxysilane. To increase the adhesion between the polymeric layer and the polymer formed in the crack, the adhesion promoter can be mixed with a precursor for the polymeric layer before the final layer is formed.

The polymeric layer 110 optionally may include an activator. The activator may be a general activator for polymerization, or it may be a corresponding activator for the specific polymerizer present in the microfluidic network. If the activator is present in the polymeric layer, it is preferably a corresponding activator for the polymerizer that is present in the first microfluidic network. The activator may be a catalyst or an initiator.

In one example, corresponding catalysts for polymerizable cyclic olefins include ring opening metathesis polymerization (ROMP) catalysts such as Schrock catalysts (Bazan et al., (1991)) and Grubbs catalysts (Grubbs et al., (1998)). In another example, corresponding catalysts for lactones and lactams include cyclic ester polymerization catalysts and cyclic amide polymerization catalysts, such as scandium triflate.

In another example, corresponding catalysts for the polymerization of silanol-functional siloxanes with alkoxy-functional siloxanes include any catalyst that promotes silanol condensation or the reaction of silanol with alkoxy-functional siloxane groups. Examples of these catalysts include amines and include metal salts, where the metal can be lead, tin, zirconium, antimony, iron, cadmium, calcium, barium, manganese, bismuth or titanium.

In another example, corresponding activators for epoxy polymers include any activator that can react with two or more epoxy functional groups. For example, an epoxy polymer can be formed by the reaction at or below room temperature (for example, 25° C.) of one compound containing two or more epoxy functional groups with another compound containing either at least one primary amine group or at least two secondary amine groups. In these systems, an amine compound can be present in a composite as the activator for an epoxy-functionalized polymerizer.

Corresponding activators for the polymerizer may be two-part activators, in which two distinct substances must be present in combination for the activator to function. In one example of a two-part catalyst system, one part of the catalyst may be a tungsten compound, such as an organoammonium tungstate, an organoarsonium tungstate, or an organophosphonium tungstate; or a molybdenum compound, such as organoammonium molybdate, an organoarsonium molybdate, or an organophosphonium molybdate. The second part of the catalyst may be an alkyl metal halide, such as an alkoxyalkyl metal halide, an aryloxyalkyl metal halide, or a metaloxyalkyl metal halide in which the metal is independently tin, lead, or aluminum; or an organic tin compound, such as a tetraalkyltin, a trialkyltin hydride, or a triaryltin hydride.

In another example of a two-part activator system, a corresponding polymerizer may contain unsaturated polymerizable compounds, such as acrylates, alkylacrylates (including methacrylates and ethacrylates), styrenes, isoprene, and butadiene. In this example, atom transfer radical polymerization (ATRP) may be used, with one of the two components being mixed with the polymerizable compound and the other acting as the initiator. One component can be an organohalide such as 1-chloro-1-phenylethane, and the other component can be a copper(I) source such as copper(I) bipyridyl complex. In another exemplary system, one component could be a peroxide such as benzoyl peroxide, and the other component could be a nitroxo precursor such as 2,2,6,6-tetramethylpiperidinyl-1-oxy. These systems are described in Stevens (1999, pp. 184-186).

In another example of a two-part activator system, a corresponding polymerizer may contain isocyanate functional groups (—N=C=O) and hydroxyl functional groups (—OH). In one example of this type of system, the polymerizer may be a compound containing both an isocyanate group and a hydroxyl group. In another example of this type of system, the polymerizer may include two different compounds, one compound containing at least two isocyanate groups and the other compound containing at least two hydroxyl groups. The reaction between an isocyanate group and a hydroxyl group can form a urethane linkage (—NH—C(=O)—O—) between the compounds, possibly releasing carbon dioxide. This carbon dioxide can provide for the creation of expanded polyurethane foam. Optionally, the polymerizer may contain a blowing agent, for example a volatile liquid such as dichloromethane. In these systems, condensation polymerization may be used, with one of the two components being mixed with the polymerizer and the other acting as the initiator. For example, one component could be an alkylating compound such as stannous 2-ethylhexanoate, and the other component could be a tertiary amine such as diazabicyclo[2.2.2]octane. These systems are described in Stevens (1999, pp. 378-381).

The activator may be dispersed in the polymeric layer, or it may be present in capsules. Capsules may keep the activator separate from the environment in which the polymeric layer is made and/or used. The activator in the capsules may be present with other ingredients, such as stabilizers, solvents, viscosity modifiers such as polymers, inorganic fillers, odorants, colorants and dyes, blowing agents, antioxidants and co-catalysts. If the polymerizer is a two-part polymerizer, then one of the polymerizable substances may be present in the capsules with the activator, as long as the polymerizable substance does not consume the activator. A wide variety of activators can be used, including activators that are low in cost and easy to process into capsules.

Preferably, the activator capsules have an average diameter of 10 nanometers (nm) to 1 millimeter (mm), more preferably 30-500 micrometers, more preferably 50-300 micrometers. The activator capsules have an aspect ratio of 1:1 to 1:10, preferably 1:1 to 1:5, more preferably 1:1 to 1:3, and even more preferably 1:1 to 1:2, and most preferably 1:1 to 1:1.5. It may be desirable for the activator to be present in capsules having smaller dimensions, for example, for thin film applications. Capsules having an average outer diameter less than 10 micrometers are disclosed, for example, in U.S. patent application Ser. No. 11/756,280 with inventors White et al., filed May 31, 2007.

Activator capsules may be hollow, having a capsule wall enclosing an interior volume containing the activator. Hollow capsules having a capsule wall enclosing an interior volume may have a wall thickness, for example, from 50 nm to 10 micrometers. The selection of capsule wall thickness depends on a variety of parameters, including the nature of the polymer matrix in the coating. For example, capsule walls that are too thick may not rupture when a crack approaches, while capsules walls that are too thin may break during processing. Hollow capsules may be made by a variety of techniques, and from a variety of materials. Examples of materials from which the capsules may be made, and the techniques for making them include: polyurethane, formed by the reaction of isocyanates with a diol; urea-formaldehyde, formed by in situ polymerization; gelatin, formed by complex coacervation; polyurea, formed by the reaction of isocyanates with a diamine or a triamine, depending on the degree of crosslinking and brittleness desired; polystyrenes or polydivinylbenzenes formed by addition polymerization; and polyamide, formed by the use of a suitable acid chloride and a water soluble triamine.

Activator capsules may be particles containing a mixture of the activator and an encapsulant. These particles may be made by a variety of techniques, and from a variety of materials. For example, small particles or a powder of the activator may be dispersed into a liquid containing the encapsulant, followed by solidification of the mixture of encapsulant and activator. Particles of the protected activator in an encapsulant are preferably microparticles having an average diameter of at most 500 micrometers. The encapsulant is soluble or swellable in the polymerizer, and is a solid at room temperature. The polymerizer may dissolve the encapsulant, releasing the activator and forming a polymer. The polymerizer may swell the encapsulant so that the particle can be penetrated by the polymerizer sufficiently to allow polymerization of the polymerizer when it contacts the activator.

The substrate 120 is in contact with the polymeric layer 110. The polymeric layer may be present on one or more surfaces of the substrate. For a surface of the substrate that is in contact with the polymeric layer, the polymeric layer may completely or partially cover the surface.

The substrate 120 includes a substrate matrix 130. The substrate matrix may include a polymer, a ceramic, a metal, or combinations of these. Examples of polymers include polyamides such as nylons; polyesters such as poly(ethylene terephthalate) and polycaprolactone; polycarbonates; polyethers; epoxy polymers; epoxy vinyl ester polymers; polyimides such as polypyromellitimide (for example KAPTAN); phenol-formaldehyde polymers (for example BAKELITE); amine-formaldehyde polymers such as a melamine polymer; polysulfones; poly(acrylonitrile-butadiene-styrene) (ABS); polyurethanes; polyolefins such as polyethylene, polystyrene, polyacrylonitrile, polyvinyls, polyvinyl chloride and poly(DCPD); polyacrylates such as poly(ethyl acrylate); poly (alkylacrylates) such as poly(methyl methacrylate); polysilanes such as poly(carborane-siloxane); and polyphosphazenes. Examples of ceramics include hydroxyapatite, titanium oxide, lead zirconate, titanate, alumina, silica, zirconia, silicon nitride, barium titanate, and silicon carbide, or mixtures thereof. Examples of metals include steels, molybdenum, nickel, gold, silver, platinum, titanium-aluminum-vanadium alloys, tungsten, and aluminum, or mixtures or alloys thereof. The substrate matrix can include other ingredients, such as stabilizers, antioxidants, flame retardants, plasticizers, colorants and dyes, fragrances, particulate fillers, reinforcing fibers, and adhesion promoters. Preferably the substrate matrix includes a polymer.

Preferably the substrate matrix 130 is more flexible than the polymeric layer 110. The flexibility of a material may be quantified in terms of the elastic modulus of the material, with a more flexible material having a lower elastic modulus. Preferably the substrate matrix 130 has an elastic modulus that is lower than that of the polymeric layer 110. More preferably, the substrate matrix has an elastic modulus that is at least 5% lower than the elastic modulus of the polymeric layer, more preferably that is at least 10% lower than the elastic modulus of the polymeric layer, more preferably that is at least 20% lower than the elastic modulus of the polymeric layer, and more preferably that is at least 25% lower than the elastic modulus of the polymeric layer.

The substrate 120 includes a first microfluidic network 140 in the substrate matrix 130. The first microfluidic network includes a plurality of channels having a plurality of interconnects, where at least a portion the channels have a dimension less than 500 micrometers. Interconnects are present in the network wherever a first portion of a channel contacts a second portion of the channel, or wherever a first channel contacts a second channel. In this manner, interconnects connect the channel at a plurality of locations, thus establishing fluid communication between the channels. Since the first microfluidic network 140 is in fluid communication with the polymeric layer 110, a polymerizer can flow from the network into the polymeric layer if a crack in the polymeric layer contacts the substrate 120.

The first microfluidic network 140 may include a plurality of substantially tubular channels having a plurality of interconnects, where at least a portion the channels have a diameter less than 500 micrometers. The term "substantially tubular" means that the majority of the cross-sectional periphery of the channel through the substrate matrix is curved in shape. Curved can include circular, elliptic, rounded, arched, parabolic and other curved shapes. The average diameter of the substantially tubular channels preferably is from 0.1 to 1000 micrometers, more preferably is from 10 to 500 micrometers, and more preferably is from 50 to 250 micrometers.

Since the presence of channels in the substrate matrix 130 can affect the structural properties of the substrate, microfluidic networks having maximum channel spacing and minimum channel diameter are preferred. Preferably the spacing between channels in a given layer is at most ten times the channel diameter. The optimum channel spacing can be affected by the microfabrication process used to form the microfluidic network, including the materials and processing conditions used. For example, for a microfluidic network formed by direct-write assembly using a fugitive material and a matrix precursor, the viscoelastic properties of the fugitive material and/or the matrix precursor can affect the channel spacings that may be obtained. In addition, the channel diameter preferably is large enough for polymerizer to flow through the network to the cracks in the polymeric layer.

Preferably the first microfluidic network 140 in the substrate matrix 130 includes at least one channel, aligned along a first plane in the x- and y-dimensions, that extends perpendicular to the first plane in the z-dimension and that continues in a substantially planar fashion in a second plane in the x- and y-dimensions. In this example, the second plane is substantially parallel to the first plane, and interconnects are formed in the z-dimension when one or more x-y dimension channel contacts in the z-dimension. Thus, the channel in the substrate matrix is longer in the x- and y-dimensions than in the z-dimension.

A fluid in the first microfluidic network 140 can flow through the channels and the interconnects of the network. If the substrate includes an inlet port, a fluid delivered through the inlet port can flow through the channels and interconnects within the substrate matrix, at least partially filling the network. The first microfluidic network 140 may be in fluid communication with an inlet port, such as an inlet port for the polymerizer. Preferably the inlet port is on a different surface of the substrate matrix than the surface in contact with the polymeric layer. The first microfluidic network 140 may be in fluid communication with a reservoir, such as a reservoir for the polymerizer. It may be desirable to provide a reservoir in fluid communication with the network, so that the network can be filled with the polymerizer automatically.

The substrate 120 includes a polymerizer in the first microfluidic network 140. The polymerizer may include a polymerizable substance such as a monomer, a prepolymer, or a functionalized polymer having two or more reactive groups. The polymerizer optionally may contain other ingredients, such as other monomers and/or prepolymers, stabilizers, solvents, viscosity modifiers such as polymers, inorganic fillers, odorants, colorants and dyes, blowing agents, antioxidants, and co-catalysts. A polymerizer may also contain one part of a two-part catalyst, with a corresponding initiator being the other part of the two-part catalyst. The polymerizer preferably is capable of flowing. Preferably, the polymerizer is a liquid.

Examples of polymerizable substances include cyclic olefins, preferably containing 4-50 carbon atoms and optionally containing heteroatoms, such as dicyclopentadiene (DCPD), substituted DCPD, norbornene, substituted norbornene, cyclooctadiene, and substituted cyclooctadiene. Examples of polymerizable substances also include unsaturated monomers such as acrylates, alkylacrylates (including methacrylates and ethacrylates), styrenes, isoprene and butadiene. Examples of polymerizable substances also include lactones (such as caprolactone) and lactams, which, when polymerized, will form polyesters and nylons, respectively. Examples of polymerizable substances also include epoxy-functionalized monomers, prepolymers or polymers.

Examples of polymerizable substances also include functionalized siloxanes, such as siloxane prepolymers and polysiloxanes having two or more reactive groups. Functionalized siloxanes include, for example, silanol-functional siloxanes, alkoxy-functional siloxanes, and alkyl- or vinyl-functional siloxanes. Self-healing materials that include functionalized siloxanes as polymerizers are disclosed, for example, in U.S. Patent Application Publication 2006/0252852 A1 with inventors Braun et al., published Nov. 9, 2006; and in U.S. patent application Ser. No. 11/620,276 with inventors Braun et al., filed Jan. 5, 2007.

The polymerizer may contain a two-part polymerizer, in which two different substances react together to form a polymer when contacted with an activator. Examples of polymers that can be formed from two-part polymerizer systems include polyethers, polyesters, polycarbonates, polyanhydrides, polyamides, formaldehyde polymers (including phenol-formaldehyde, urea-formaldehyde and melamine-formaldehyde), and polyurethanes. For example, a polyurethane can be formed by the reaction of one compound containing two or more isocyanate functional groups (—N=C=O) with another compound containing two or more hydroxyl functional groups (—OH).

The substrate 120 optionally may include a second microfluidic network 150. If present, the second microfluidic network includes an activator in the network. Activators that may be present in the network include the activators described above as optionally present in the polymeric layer 110. Preferably the activator is in a fluid form, and may include one or more solvents or other substances that provide for the activator to flow through the network. Since the second microfluidic network 120, if present, is in fluid communication with the polymeric layer 110, an activator can flow from the network into the polymeric layer if a crack in the polymeric layer contacts the substrate 120.

If a second microfluidic network 150 is present in the substrate, the structure of the second microfluidic network generally may be as described above for the first microfluidic network 140. The structure of the second microfluidic network may be identical to that of the first microfluidic network, or the structures may be different. The second microfluidic network 150 may be in fluid communication with an inlet port, such as an inlet port for the activator. Preferably the inlet port is on a different surface of the substrate matrix than the surface in contact with the polymeric layer. The second microfluidic network 150 may be in fluid communication with a reservoir, such as a reservoir for the activator. It may be desirable to provide a reservoir in fluid communication with the network, so that the network can be filled with the activator automatically.

The substrate 120 optionally may include one or more additional microfluidic networks 160. If present, an additional microfluidic network may include the polymerizer or the activator that is also present in the first and second microfluidic networks, respectively. In one example, the substrate includes a plurality of additional microfluidic networks, where a portion of the additional microfluidic networks include the polymerizer, and the remaining additional microfluidic networks include the activator.

An additional microfluidic network 160 may include a substance other than the polymerizer and the activator. In one example, an additional microfluidic network may include the second part of a two-part polymerizer, where the first part of the two-part polymerizer is in the first microfluidic network 140. In another example, an additional microfluidic network may include the second part of a two-part activator, where the first part of the two-part activator is in the first microfluidic network 150. In another example, an additional microfluidic network may include one or more other substances. Examples of other substances that may be present in an additional microfluidic network include stabilizers, solvents, viscosity modifiers, antioxidants, flame retardants, plasticizers, blowing agents, colorants and dyes, fragrances, particulate fillers, reinforcing fibers, and adhesion promoters. Preferably the contents of an additional microfluidic network are in fluid form.

If an additional microfluidic network 160 is present in the substrate, the structure of the additional microfluidic network generally may be as described above for the first microfluidic network 140. The structure of the additional microfluidic network may be identical to that of the first and/or second microfluidic networks, or the structures may be different. The additional microfluidic network 160 may be in fluid communication with an inlet port, which is preferably on a different surface of the substrate matrix than the surface in contact with the polymeric layer. The additional microfluidic network 160 may be in fluid communication with a reservoir. It may be desirable to provide a reservoir in fluid communication with the network, so that the network can be filled with the fluid contents automatically.

A composite of a polymeric layer and a substrate in contact with the polymeric layer, where the substrate includes a substrate matrix, a microfluidic network in the substrate matrix and in fluid communication with the polymeric layer, and a polymerizer in the network, may be a self-healing composite. After a crack occurs in the polymeric layer, the polymerizer can wick from the microfluidic network into the crack through capillary action. Preferably the wicking of the polymerizer occurs without any external pressure on the composite. Once in the crack plane, the polymerizer can interact with an activator to cause polymerization, rebonding the crack faces autonomically. After a sufficient time period, the crack is healed, and the structural integrity of the polymeric layer is restored. If a crack reopens under subsequent loading, the healing cycle can be repeated.

In one example, a self-healing composite includes a polymeric layer that contains an activator, and a substrate in contact with the polymeric layer, where the substrate includes a substrate matrix, a microfluidic network in the substrate matrix and in fluid communication with the polymeric layer, and a polymerizer in the network. In this example, the polymerizer can wick from the microfluidic network into a crack in the polymeric layer, contact the activator in the polymeric layer, and polymerize to rebond the crack faces autonomically.

In another example, a self-healing composite includes a polymeric layer and a substrate in contact with the polymeric layer, where the substrate includes a substrate matrix, a first microfluidic network in the substrate matrix and in fluid communication with the polymeric layer, a polymerizer in the first network, a second microfluidic network in the substrate matrix and in fluid communication with the polymeric layer, and an activator in the second network. In this example, the polymerizer can wick from the first microfluidic network into a crack in the polymeric layer, and the activator can wick from the second microfluidic network into the crack. Contact between the polymerizer and the activator causes polymerization, rebonding the crack faces autonomically.

In another example, a self-healing composite includes a polymeric layer and a substrate in contact with the polymeric layer, where the substrate includes a substrate matrix, a first microfluidic network in the substrate matrix and in fluid communication with the polymeric layer, one part of a two-part polymerizer in the first network, a second microfluidic network in the substrate matrix and in fluid communication with the polymeric layer, and the second part of a two-part polymerizer in the second network. In this example, the two parts of the polymerizer can wick from the microfluidic networks into a crack in the polymeric layer. Contact between the two parts of the polymerizer causes polymerization, rebonding the crack faces autonomically. In this example, an activator may be present in the polymeric layer, or an activator may be provided by a third microfluidic layer.

Composite 100 may be made by forming the first microfluidic network 140 in the substrate matrix 130, where the first microfluidic network is in fluid communication with a surface of the substrate matrix; contacting the surface of the substrate matrix with the polymeric layer 110; and placing the polymerizer in the first microfluidic network. Contacting the surface of the substrate matrix 130 with the polymeric layer 110 may include applying a polymeric layer precursor to the surface of the substrate matrix, and solidifying the polymeric layer precursor to form the polymeric layer. If the polymeric layer 110 includes optional activator, contacting the surface of the substrate matrix 130 with the polymeric layer 110 may further include combining the activator with the polymeric layer precursor.

In one example, composite 100 may be made by forming the first microfluidic network 140 in the substrate matrix 130, such that the first microfluidic network is in fluid communication with a surface of the substrate matrix; contacting the surface of the substrate matrix with the polymeric layer 110 comprising the corresponding activator for the polymerizer; and placing the polymerizer in the first microfluidic network.

In another example, composite 100 may be made by forming the first microfluidic network 140 in the substrate matrix 130 and forming the second microfluidic network 150 in the substrate matrix, such that the first and second microfluidic networks each is in fluid communication with a surface of the substrate matrix; contacting the surface of the substrate matrix with the polymeric layer 110; placing the polymerizer in the first microfluidic network; and placing the corresponding activator in the second microfluidic network.

The first microfluidic network 140, and optionally the second microfluidic network 150, in the substrate matrix 130 may be formed using one or more of a variety of microfabrication techniques. Examples of microfabrication techniques include laser machining, laser chemical processing, sacrificial wax, soft lithography, photopatterning, fused deposition, and two-photon polymerization. Two-dimensional microfluidic devices are typically made by photolithographic or soft lithographic techniques and are limited to patterns on a flat surface, or at most a few stacked layers. Forming these devices requires repetitive lithographic processing, in which each layer requires a separate mask or stamp. Multiple series of plates may be joined to form structures having a few vertical layers. Microfluidic networks and their application in microfluidic devices are described, for example, in Anderson (2000).

In one example, a substrate having a substrate matrix and a microfluidic network in the substrate matrix may be formed by direct-write assembly. In this method, a fugitive material is deposited on a surface to form a three-dimensional scaffold of the fugitive material. The scaffold may then be infiltrated with a matrix precursor, or the scaffold may be formed in the liquid matrix precursor. The matrix precursor is then solidified to form a substrate matrix in which the scaffold is embedded. The fugitive material of the scaffold is then removed, leaving a network of interconnected channels in the substrate matrix. Systems for forming microfluidic networks by direct-write assembly, and networks formed by the systems, are described, for example, in U.S. Patent Application Publication 2004/0226620 A1 with inventors Therriault et al., published Nov. 18, 2004.

Figure 2:
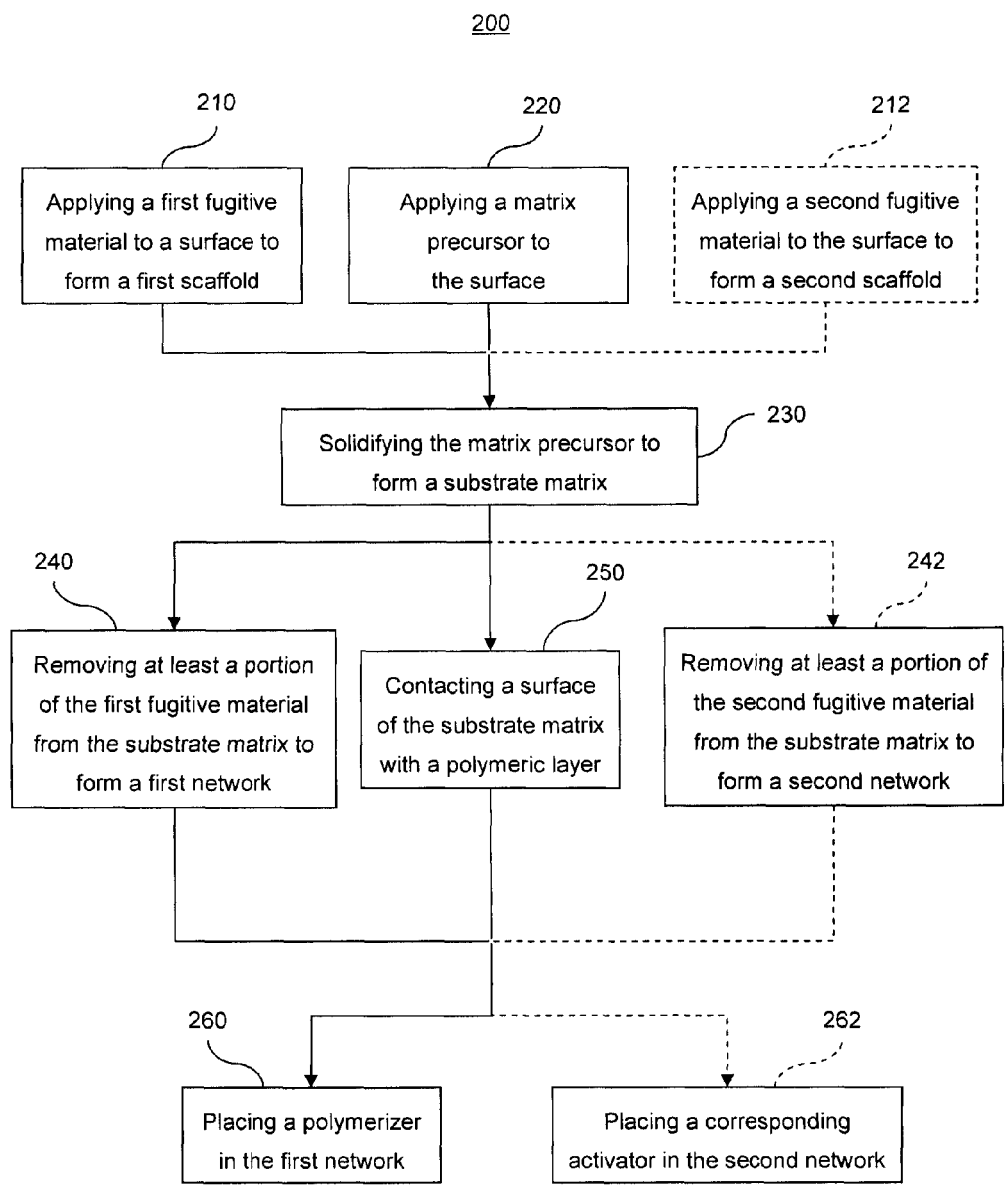
FIG. 2 represents a method of making a composite material.

FIG. 2 represents a method 200 of making a composite material, including applying a first fugitive material to a surface to form a first scaffold 210, applying a matrix precursor to the surface 220, solidifying the matrix precursor to form a substrate matrix 230, removing at least a portion of the first fugitive material from the substrate matrix to form a first network 240, contacting the surface of the substrate matrix with a polymeric layer 250, and placing a polymerizer in the first network 260. The first scaffold includes substantially tubular filaments of the first fugitive material, and the filaments may have an average diameter of from 0.1 to 1000 micrometers. Once the matrix precursor has been solidified, the substrate matrix encapsulates at least a portion of the first scaffold. The first network includes substantially tubular channels in the substrate matrix, and is in fluid communication with the surface of the substrate matrix that is contacted with the polymeric layer.

The applying a first fugitive material to the surface to form a first scaffold 210 may be performed before, during or after the application of the matrix precursor to the surface 220. The removing at least a portion of the first fugitive material from the substrate matrix to form a first network 240 may be performed before, during or after the contacting the surface of the substrate matrix with a polymeric layer 250.

The method 200 optionally may include applying a second fugitive material to the surface to form a second scaffold 212; removing at least a portion of the second fugitive material from the substrate matrix to form a second network 242; and placing a corresponding activator in the second network 262. The second scaffold includes substantially tubular filaments of the second fugitive material, and the filaments may have an average diameter of from 0.1 to 1000 micrometers. Once the matrix precursor has been solidified, the substrate matrix encapsulates at least a portion of the second scaffold. The second network includes substantially tubular channels in the substrate matrix, and is in fluid communication with the surface of the substrate matrix that is contacted with the polymeric layer.

The applying a second fugitive material to the surface to form a second scaffold 212 may be performed before, during or after the applying a first fugitive material to a surface to form a first scaffold 210, and may be performed before, during or after the application of the matrix precursor to the surface 220. The removing at least a portion of the second fugitive material from the substrate matrix to form a second network 242 may be performed before, during or after the removing at least a portion of the first fugitive material from the substrate matrix to form a first network 240, and may be performed before, during or after the contacting the surface of the substrate matrix with a polymeric layer 250. The placing a corresponding activator in the second network 262 may be performed before, during or after the placing a polymerizer in the first network 260.

Applying a first fugitive material to a surface to form a first scaffold 210 may be controlled by a computer. In one example, the first fugitive material is applied to a surface with a robotically controlled deposition machine (RCD). FIGS. 3A and 3B illustrate an example of a RCD 300 forming a scaffold 390 of a fugitive material 350 on a surface 320. FIG. 3B depicts the deposition of a fugitive material filament 310 on the surface 320 by the RCD 300. Through the computer-controlled, layer-by-layer deposition of the fugitive material filament 310 on a surface, one-dimensional, two-dimensional, and three-dimensional fugitive material scaffolds may be formed. Microfluidic devices may then be formed when these scaffolds are removed from the substrate matrix.

The surface 320 may be the surface of any material that can support a scaffold of the deposited fugitive material filaments 310. Examples of materials for the surface 320 include glass, plastic, metal and combinations. The surface 320 may be planar or non-planar, including curved.

The RCD 300 includes a deposition head 330 including a syringe 340 that can contain a fugitive material 350, and including an orifice 360. Air pressure may be used to force the fugitive material 350 through the tip of the syringe 340 and out the orifice 360, such as a needle. The fugitive material 350 thus emerges from the orifice 360 as the filament 310 and is deposited by gravity on the surface 320.

The average diameter of the filament 310 deposited on the surface 320 may be controlled by the inner diameter of the orifice 360 and the pressure applied to the syringe 340. In one example, the average diameter of the filament 310 is ±20% that of the orifice 360, preferably is ±10% that of the orifice 360, and more preferably is ±5% that of the orifice 360. In another example, the average diameter of the filament 310 is less than that of the orifice 360. A smaller average diameter filament may be produced by using a fugitive material 350 capable of self-assembly after extrusion. Self-assembly is described, for example, be found in H. Fan et al. (2000). Preferably, the average diameter of the extruded filament 310 is from 0.1 to 1000 micrometers, more preferably is from 10 to 500 micrometers, and more preferably is from 50 to 250 micrometers.

The surface 320 and/or the deposition head 330 may be moved relative to each other at a desired speed and direction to form the fugitive material scaffold. With the planar motion of the surface 320 (in the x- and y-directions), the motion of the deposition head 330 (in the z-direction), and the fugitive material 310 flowing from the orifice 330, it is possible to build scalable, one-, two-, and three-dimensional scaffolds, such as by using a layer-by-layer building sequence. In one example, the RCD 300 first deposits the filament 310 onto surface 320 on a moving x-y platform to yield a two-dimensional scaffold layer. Then, the platform or the deposition head 330 is moved in the z-direction to deposit another x-y scaffold layer. In this manner, scaffolds having 100's of layers in the z-dimension may be formed.

Applying a first fugitive material to a surface to form a first scaffold 210 may include adjusting the temperature of the fugitive material. In one example, applying a first fugitive material to a surface to form a first scaffold may be carried out at a reduced temperature, to increase the resistance of the fugitive material to flow. This may be particularly useful in forming scaffolds having a three-dimensional spanning structure. The temperature of the fugitive material may also be adjusted to control the degree of contact between the filaments, which can then control the degree of interconnection between the channels in the resulting microfluidic network.

Fugitive materials preferably are capable of forming a scaffold and of being substantially removed from the substrate matrix. The term "substantially removed" means that at least 80%, preferably at least 90%, and more preferably at least 97% of the total weight of fugitive material used to form the scaffold is removed from the substrate matrix.

Scaffold fabrication can exploit three desirable properties of the fugitive material: (1) a well-controlled viscoelastic response, (2) the ability to maintain shape during infiltration and curing of the host material, and (3) the ability to undergo a solid-to-liquid phase transition at modest temperature, thus facilitating its removal to form the final microcapillary structure in the resultant host. Viscoelastic response refers to the combination of the shear-thinning behavior and the viscosity of the fugitive material. Shear-thinning represents the decrease in viscosity of a fluid under shear forces. Thus, good shear-thinning behavior allows the fugitive material to flow from a small orifice during deposition and rapidly "set" to facilitate shape retention of the deposited features. Preferably, once deposited, the fugitive material has a viscosity high enough to provide the necessary structural support to form and preserve a three-dimensional scaffold, even as the filament spans gaps in the underlying filament layers. Thus, fugitive materials preferred for forming three-dimensional scaffolds are capable of maintaining a three-dimensional shape, without collapse, under deposition conditions. Fugitive materials having a temperature-dependent viscosity are preferred. Preferable fugitive materials having temperature-dependent viscosity can maintain the complex structure of the scaffold when cold, and can liquefy when hot. In one example, a preferred fugitive material can extrude from the deposition orifice and can have sufficient internal strength to span underlying fugitive material scaffolding, while maintaining its shape.

Preferred fugitive materials are organic materials with or without inorganic constituents. More preferred fugitive materials include at least 80 weight percent (wt %) nonvolatile components. More preferred fugitive materials include a majority of organic constituents by weight. Examples of preferred fugitive materials include Prussian blue paste, such as LOCTITE® (Henkel; Rocky Hill, Conn.); petroleum jelly such as Vaseline VASELINE® (Unilever; Englewood Cliffs, N.J.); various lubricants such as CIP (McGlaughlin Oil Co.; Columbus, Ohio); and lubricants combined with viscosity modifiers, such as CIP Lube containing fumed silica particles. Prussian blue paste can contain 80-85% paraffinic hydrocarbon, 5-10% ferric ferrocyanide, and 1-15% mineral oil. CIP lubricant can contain 50-75% white mineral oil, 1-10% aluminum sterate, and 5-20% other constituents.

By mixing various organic materials with inorganic constituents, the viscosity of the fugitive material may be modified. Thus, to achieve the desired viscosity performance of the fugitive material, one or more viscosity modifiers may be combined with one or more base materials, such as Prussian blue paste, petroleum jelly, or lubricants, to give the desired characteristics to the fugitive material. Preferable viscosity modifiers that may be added to a base material to form fugitive materials include porous colloid particles, such as fumed silica (i.e. M-5P fumed silica particles, CAB-O-SIL®, Cabot division; Alpharetta, Ga.); calcium complex rods; lithium hydroxystearate fibers; liquid crystals; viscoelastic micelles; low molecular weight polymers and oligomers; glass and polymer beads; polymer and ceramic microcapsules; and polymer, ceramic or metal short fibers. Any one or more of these viscosity modifiers may be combined with an organic containing base, such as CIP Lube, to give a fugitive material. The use of calcium complex rods and lithium hydroxystearate fibers to modify an organic containing base composition is disclosed, for example, in Mas, R. et al. (1994). Liquid crystals and viscoelastic micelles and their use as viscosity modifiers are disclosed, for example, in Bautista, F. et al., (1999).

Preferably fugitive materials contain less than 10 wt % of one or a combination of viscosity modifiers. More preferably fugitive materials contain less than 5 wt % of one or a combination of viscosity modifiers, and more preferably contain less than 2.5 wt % of one or a combination of viscosity modifiers. When porous colloidal particles are used as viscosity modifiers, the particles preferably have average diameters from 10 to 30 nm. The addition of porous colloidal particles may be used to modify the stiffness of organic and organic/inorganic compositions to improve their performance as fugitive materials.

Fugitive materials may also be co-extruded. If an orifice with more than one channel is used to extrude the scaffolding filament, the filament may include more than one fugitive material, or a fugitive material in combination with a non-fugitive material. For example, a fugitive material filament may have an inner material of Prussian blue paste and an outer material of Vaseline® petroleum jelly. In this way, a microfluidic network may be formed where the viscosities of multiple fugitive materials are used to control interconnection. In addition to providing additional viscosity control, co-extrusion of a non-fugitive material with a fugitive material can result in a microfluidic network having channels that are lined with or have an inner core of a non-fugitive material. For example, if a non-fugitive material, such as a colloidal ink or a pseudoplastic slurry containing ceramic or metal particles, is co-extruded external to the fugitive material, network channels that are lined with metal or plastic particles can be formed in the substrate matrix when the ink or slurry solidifies. Any desired particles that are compatible with microfluidic network construction can be included in the non-fugitive material. Similarly, if the non-fugitive inks or slurries are co-extruded internal to the fugitive material, their solidified network can remain in the substrate matrix when the fugitive material is removed. Non-fugitive colloidal inks and their uses are described, for example, in Smay, J. E. et al., (2002). Non-fugitive pseudoplastic slurries and their uses are described, for example, in U.S. Pat. No. 6,027,326.

Optionally applying a second fugitive material to the surface to form a second scaffold 212 may be performed as described for applying a first fugitive material to the surface to form a first scaffold 210. A second microfluidic network may be formed without applying a second fugitive material, however. For example, a single microfluidic network may be formed, and then divided into two or more microfluidic networks. In one example, the network may be divided by physically separating the network into two or more parts. In another example, selected channels within the network may be blocked, so as to form two independent microfluidic networks that are not in fluid communication with each other. In this example, a photopolymerizable substance may be placed into the microfluidic network and then selectively polymerized.

Applying a matrix precursor to the surface 220 may include applying a matrix precursor to the surface prior to the application of a first and/or second fugitive material, or it may include applying a matrix precursor to the surface after the formation of one or more scaffolds from a first and/or second fugitive material. The matrix precursor may be any substance that can fill the interstitial spaces in a scaffold exterior to the filaments, and that can solidify to form a substrate matrix. The matrix precursor may be a liquid, a slurry, or a fine powder. Preferably the matrix precursor is a polymer precursor that may be applied in a viscous, liquid state and then cured to form a solid or semi-solid substrate matrix.

Examples of matrix precursors that can solidify to form a polymer include include cyclic olefins; unsaturated monomers such as acrylates, alkylacrylates (including methacrylates and ethacrylates), styrenes, isoprene and butadiene; lactones (such as caprolactone); lactams; epoxy-functionalized monomers, prepolymers or polymers; functionalized siloxanes; and two-part precursors for polymers such as polyethers, polyesters, polycarbonates, polyanhydrides, polyamides, formaldehyde polymers (including phenol-formaldehyde, urea-formaldehyde and melamine-formaldehyde), and polyurethanes.

Examples of matrix precursors that may be deposited as a slurry or a fine powder include ceramics and metals. Examples of ceramics that may be matrix precursors include hydroxyapatite, titanium oxide, lead zirconate, titanate, alumina, silica, zirconia, silicon nitride, barium titanate, and silicon carbide, or mixtures thereof. Examples of metals that may be matrix precursors that may be deposited as host materials include steels, molybdenum, nickel, gold, silver, platinum, titanium-aluminum-vanadium alloys, tungsten, and aluminum, or mixtures or alloys thereof.

The matrix precursor may be substantially homogeneous, or it may include other substances, such as fillers and/or viscosity modifiers. For example, a matrix precursor may include particles that can change the viscosity of the precursor and/or can change the properties of the substrate matrix formed from the precursor. Examples of particles that may be present in the matrix precursor include plastic particles and non-plastic particles, such as ceramics, glasses, semiconductors, and metals. Examples of microfibers that may be present in the matrix precursor include nylon fibers, glass fibers, carbon fibers, natural fibers, aramid fibers (Kevlar® and Nomex®), and mixtures thereof. Various fibers, supports, brackets, electrodes, or tubes that allow liquid or gaseous fluids to flow to or from the microcapillary device, may also be incorporated into the matrix precursor and/or into the substrate matrix, depending on the application.

Figure 4B:
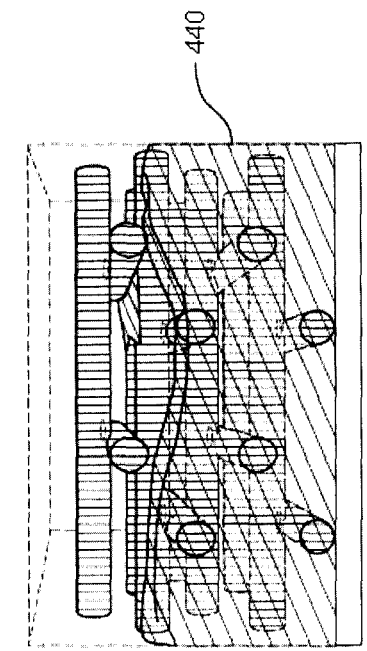
FIGS. 4A-4D represent a method of forming a substrate.
Figure 4D:
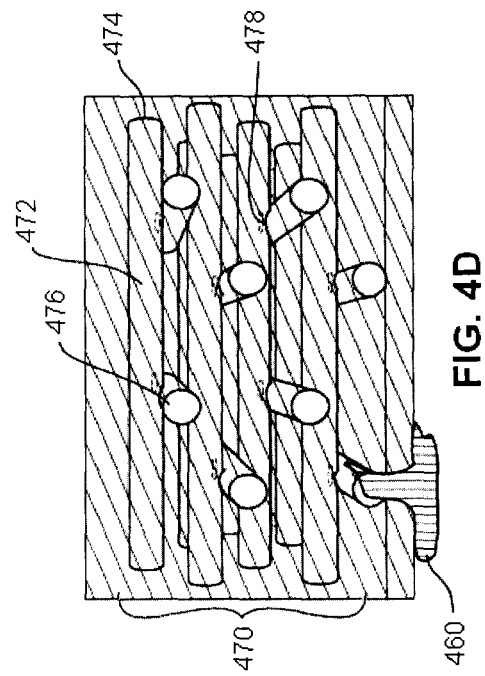
Figure 4A:
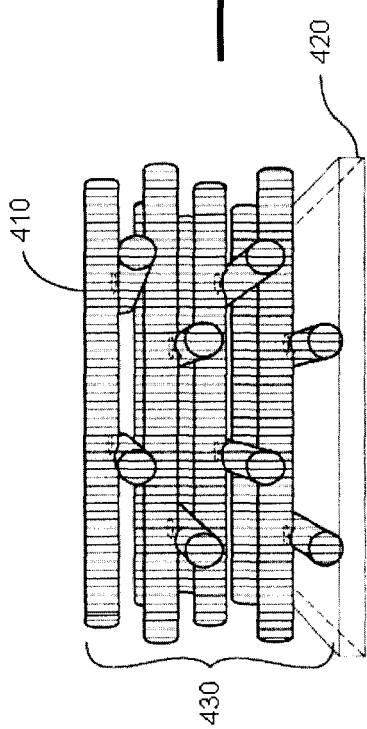

In one example, the matrix precursor is applied to the surface after the application of the first fugitive material. FIGS. 4A-4D depict a method of forming a substrate 400 including applying a fugitive material to a surface to form a scaffold, applying a matrix precursor to the surface to encapsulate at least a portion of the scaffold, solidifying the matrix precursor to form a substrate matrix, and removing at least a portion of the fugitive material from the substrate matrix to form a network. FIG. 4A depicts the deposition of a scaffold 430 of fugitive material filaments 410. FIG. 4B depicts the infiltration of a matrix precursor 440 into the scaffold 430. The matrix precursor 440 may be applied to the surface 420 to infiltrate the scaffold 430. Preferably the matrix precursor infiltrates the scaffold structure, but not the individual filaments 410. Preferably the matrix precursor does not penetrate into more than 20% of the average diameter of the fugitive material filaments. Preferably, at least a portion of the scaffold 430 is encapsulated by the matrix precursor 440. More preferably the entire scaffold 430 is encapsulated by the matrix precursor 440. To further stiffen the scaffold 430 and to minimize the infiltration of the matrix precursor 440 into the filaments 410, the scaffold may be cooled prior to contact with the matrix precursor. In one example, the scaffold is cooled to −70° C.

In another example, the matrix precursor is applied to the surface before the application of the first fugitive material. Referring again to FIG. 3, if a matrix precursor was present on the surface 320, the orifice 360 may be moved through the matrix precursor, extruding the filament 310 in the matrix precursor and onto the surface 320.

Figure 4C:
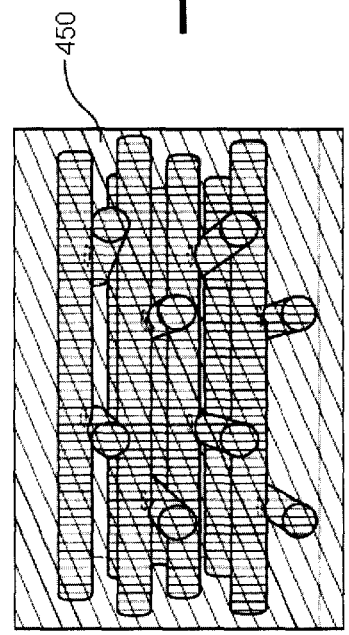

Solidifying the matrix precursor to form a substrate matrix 230 may include polymerizing the matrix precursor, removing solvent from the matrix precursor, cooling the matrix precursor, and/or converting fine flowing particles into a larger, non-flowable mass. FIG. 4C depicts the solidification of the matrix precursor 440 to form the substrate matrix 450.

In one example, the matrix precursor includes a solution or dispersion of a polymer in a solvent. When the scaffold is at least partially encapsulated in the matrix precursor, the matrix precursor may be solidified by removing solvent from the precursor to form the substrate matrix.

In another example, the matrix precursor includes a polymer that is at a temperature above its melting temperature. When the scaffold is at least partially encapsulated in the matrix precursor, the matrix precursor may be solidified by cooling the precursor to a temperature below the melt temperature of the polymer to form the substrate matrix.

In another example, the matrix precursor includes a monomer and/or prepolymer that can polymerize to form a polymer. When the scaffold is at least partially encapsulated in the matrix precursor, the matrix precursor may be solidified by polymerizing the monomer and/or prepolymer to form the substrate matrix. This polymerization may include crosslinking of monomers and/or prepolymers to form an insoluble polymer network. Crosslinking may be performed by a variety of methods, including the addition of chemical curing agents, exposure to light or other forms of radiation, or heating. If a chemical curing agent is used, it may be added to the matrix precursor before or after it is applied to the surface. If the matrix precursor is solidified by radiation curing, the fugitive material is at least partially transparent to the irradiation wavelength used. Thus, if ultraviolet light is used to cure the matrix precursor, the fugitive material preferably would be at least partially transparent to ultraviolet light.

Removing at least a portion of the first fugitive material from the substrate matrix to form a first network 240 may include heating the fugitive material, diluting and/or washing the fugitive material with a liquid, applying a vacuum to the fugitive material, or combinations of these. FIG. 4D depicts the removal of the fugitive material 460 from the substrate matrix 450 to form a network 470. The network 470 includes substantially tubular channels 472, which may be parallel 474 and perpendicular 476 to the plane of the page, and multiple interconnects 478 between the parallel and perpendicular channels. Optionally removing at least a portion of the second fugitive material from the substrate matrix to form a second network 242 may be performed in a similar way. As noted above, a second microfluidic network may be formed without applying, and subsequently removing, a second fugitive material.

Preferably the fugitive material is heated and removed under reduced pressure as a liquid. The fugitive material also may be removed from the substrate matrix by flushing the channels with warm water or other solvents. When a vacuum is used, the fugitive material may be liquefied, and then a vacuum is applied to at least a first opening in the substrate matrix. The fugitive material may then be drawn out of the channel in the substrate matrix as air is drawn into a second opening in the substrate matrix. Of course, vacuum, solvent, and other methods may be combined to enhance removal of the fugitive material from the channels in the substrate matrix.

As noted above with respect to applying the fugitive material to the surface, the temperature of the fugitive material can affect its viscosity. By using fugitive materials demonstrating a temperature dependent viscosity, the degree of interconnection between separate portions of the channels in the resulting microfluidic network may be controlled.

Channel interconnects can be formed in the substrate matrix wherever a first portion of a fugitive material filament contacts a second portion of a fugitive material filament. Interconnects are formed because the matrix precursor does not substantially penetrate an area where filament contact occurs. The degree of interconnection between a first and second portion of a channel can be altered by controlling the amount of filament blending at the contact point. This may be accomplished, for example, by altering the viscosity of the fugitive material, such as by adjusting the temperature. In one example, use of a high viscosity fugitive material can cause the interconnected area to be small, since a first filament portion applied atop a second filament portion may blend or sink into the second filament portion by a relatively small amount. In this example, the cross-sectional z-dimension of the interconnect is preferably a little less than twice the diameter of the contacting portions of the one or more filaments. In another example, use of a low viscosity fugitive material can cause the interconnected area to be large, since the first filament portion may fully blend or sink into the second filament portion. In this example, the cross-sectional z-dimension of the interconnect will approximate the cross-sectional dimension of the contacting portions of the one or more filaments. Preferably a high viscosity fugitive material is used, so as to provide small interconnections.

Because the interconnects are formed by contact of one or more fugitive material filaments having a diameter nearly identical to that of the channel, the longest cross-sectional dimension of an interconnect preferably is less than 2.5 times the average diameter of the one or more channel that contacts to form the interconnect. More preferably, the longest cross-sectional dimension of the interconnect is less than 2.2 times the average diameter of the one or more channel that contacts to form the interconnect. In an especially preferred embodiment, the longest cross-sectional dimension of the interconnect is less than twice the average diameter of the one or more channel that contacts to form the interconnect. If an interconnect if formed by more than one contact, such as when three filaments overlap in the z-dimension to form two contacts, the longest cross-sectional dimension of the resultant multi-contact interconnect (which is actually formed from three filaments contacting to form two interconnects separated by a channel) is preferably less than 3.75 times the average diameter of the individual filaments.

Forming a substrate having a substrate matrix and a network in the substrate matrix by applying a first fugitive material to a surface to form a first scaffold, applying a matrix precursor to the surface, solidifying the matrix precursor to form a substrate matrix, and removing at least a portion of the first fugitive material from the substrate matrix can provide a number of advantages over conventional microfabrication techniques. These advantages include the use of a RCD instead of lithography; the lack of a need for a lithography master; the lack of a need for assembling with multiple layers; the ability to construct the substrate with a wider variety of materials, including structural polymers such as epoxy; the formation of the microfluidic network in a single step; and the ability to complete the fabrication in less than 24 hours, depending on the time required to solidify the matrix precursor.

Contacting the surface of the substrate matrix with a polymeric layer 250 may include placing the polymeric layer in contact with the substrate matrix. In one example, the polymeric layer and the substrate matrix may be bonded to each other with an adhesive. In another example, the polymeric layer and/or substrate matrix may be heated or irradiated to bond the layer and the matrix together.

Contacting the surface of the substrate matrix with a polymeric layer 250 may include applying a polymeric layer precursor to the substrate matrix, and solidifying the polymeric layer precursor into the polymeric layer. Solidifying the polymeric layer precursor to form the polymeric layer may include polymerizing the precursor, removing solvent from the precursor, and/or cooling the precursor.

In one example, the polymeric layer precursor includes a solution or dispersion of a polymer in a solvent, and the precursor may be solidified by removing solvent from the precursor. In another example, the polymeric layer precursor includes a polymer that is at a temperature above its melting temperature, and the precursor may be solidified by cooling the precursor to a temperature below the melt temperature of the polymer. In another example, the polymeric layer precursor includes a monomer and/or prepolymer that can polymerize to form a polymer, and the precursor may be solidified by polymerizing the monomer and/or prepolymer. This polymerization may include crosslinking of monomers and/or prepolymers.

Examples of polymeric layer precursors that can solidify to form a polymeric layer include cyclic olefins; unsaturated monomers such as acrylates, alkylacrylates (including methacrylates and ethacrylates), styrenes, isoprene and butadiene; lactones (such as caprolactone); lactams; epoxy-functionalized monomers, prepolymers or polymers; functionalized siloxanes; and two-part precursors for polymers such as polyethers, polyesters, polycarbonates, polyanhydrides, polyamides, formaldehyde polymers (including phenol-formaldehyde, urea-formaldehyde and melamine-formaldehyde), and polyurethanes.

Placing a polymerizer in the first microfluidic network 260 may include any of a variety of methods for introducing a fluid into a microfluidic network. In one example, the polymerizer may be injected into one or more channels of the network. In another example, one or more channel openings may be placed in contact with a reservoir of polymerizer. The polymerizer may then flow through the network through capillary action. Optionally placing an activator in the second microfluidic network 262 may be performed in a similar way.

It may be desirable to block the openings of a portion of the channels at the surfaces of the substrate matrix. For example, all the channel openings except for a network inlet and a network outlet may be blocked, such as with a polymer. Air or other fluid that is present in the network may then escape through the outlet as the polymerizer, activator and/or other substance flows through the network. The outlet also may be placed under vacuum, which may assist the flow of polymerizer, activator and/or other substance through the network.

The following examples are provided to illustrate one or more preferred embodiments of the invention. Numerous variations may be made to the following examples that lie within the scope of the invention.

EXAMPLES

Example 1

Formation of Substrates Including a Microfluidic Network

Direct-write assembly was used to embed a fully interconnected 3D microfluidic network in an epoxy substrate matrix. A 3D scaffold was fabricated with a fugitive organic ink using a robotic deposition apparatus (Model JL2000, Robocasting Enterprises) in a layerwise scheme. The fugitive ink was composed of 60 wt % petroleum jelly (VASELINE®, Unilever) and 40 wt % microcrystalline wax (BARD'S® Tacky-Wax; Bard) and housed in a syringe (barrel diameter=9.5 mm) with a cylindrical nozzle having a diameter of 200 micrometers. The syringe was mounted on a z-stage, which was suspended above a moving x-y stage. The three-axis motion was controlled during deposition using custom-designed software (Robocad version 2.0). The syringe was placed in a device (HP7X, EFD) that enhanced the air pressure to approximately 2.9 megaPascals (MPa).

A 3D periodic scaffold (45 mm×7 mm×10 mm) was fabricated, which was composed of an array of 200 micrometer cylindrical rods with a center-to-center separation distance of 2 mm between each rod in a given layer. Consecutive layers were rotated by 90°, and every other layer was shifted by 1 mm in plane to create a face-centred tetragonal geometry. After deposition, the ink scaffold was infiltrated with uncured ENVIROTEX LITE® epoxy (ETI) and allowed to cure at room temperature for 48 h. After curing, the beam-shaped substrate was cut to size and polished. The substrate was approximately 42-45 mm long, 5-7 mm high, and 7-10 mm wide.

The fugitive ink was then removed by heating the substrate to 75° C. and applying a light vacuum. The bottom and sides of the substrate were sealed by selectively polymerizing a photopolymer (NOA 61, Norland Optical Adhesives) in the channels using a mercury source ($\lambda$=365 nm).

The rectangular microfluidic network design included vertical channels and horizontal channels. The vertical channels could deliver polymerizer to the cracks in the polymeric layer, and the horizontal channels allowed for the network to be filled with polymerizer from the side. The channel diameter of 200 micrometers was sufficiently small to minimize the total pore volume, yet large enough for ease of fabrication and network operation.

Example 2

Formation of Composites Having a Polymeric Layer on a Substrate

Grubbs catalyst, benzylidene-bis(tricyclohexylphosphine) dichlororuthenium (Sigma-Aldrich; Milwaukee, Wis.), was further processed to achieve better solubility in dicyclopentadiene (DCPD). The catalyst was recrystallized using methylene chloride and acetone in a method described by Jones et al., "Catalyst morphology and dissolution kinetics for self-healing polymers", *Chem. Mater.* 18, 1312-1317 (2005). The resulting catalyst crystals had a rod-like morphology, with an average length of 10 micrometers and an average diameter of 0.75 micrometers, and formed larger aggregates with an average diameter of 150 micrometers.

A brittle epoxy coating was produced by degassing 12 parts per hundred (p.p.h.) of diethylenetriamine (Air Products) in EPON 828 resin (Miller Stephenson) with the appropriate concentration of Grubbs catalyst particles. Catalyst concentrations of 0 wt % (control), 2 wt %, 5 wt % and 10 wt % were used to investigate the effect of catalyst concentration on the self-healing performance. On mixing the catalyst particles into the uncured epoxy, larger aggregates formed. The mixture was poured into a mould, in which the microvascular substrate served as the underlying substrate. The largest catalyst particles were excluded from the final coatings, but aggregates up to 500 micrometers in diameter remained.

Before applying the coating to a substrate of Example 1, the substrate was filled with a fugitive wax (Purester 24, Strahl & Pitsch) to prevent the epoxy from infiltrating the microchannels. After curing for 24 hours (h) at room temperature, the coating was polished using lapping oil to the desired thickness (approximately 700 micrometers). A range of film thicknesses were explored (300-1,000 micrometers), and no significant affect on healing capability was found. The wax was then removed by heating the specimen to 35° C. for 8-10 minutes (min) and applying a light vacuum. The specimens were allowed to post cure at 25° C. for 24 h before testing.

Example 3

Formation of Composites Including a Polymerizer in the Microfluidic Network

The composites of Example 2 were filled with DCPD monomer using a syringe. The syringe tip was placed in an open microfluidic channel at one end of the beam, and pressure was applied to dispense the appropriate volume of fluid into the network. Several channels were left open at each end to facilitate the filling and removal of the monomer. To remove the fluid, light vacuum pressure was applied to one end of the beam until most of the fluid is evacuated, a process which took only a few seconds. After the network was filled or evacuated, the open channels were sealed with a silicone gel.

Example 4

Fracture Testing of Composites

The composites of Example 3 were loaded in a four-point bending configuration to place the coating under tension. The lower span of the test fixture was 40 mm, the upper span was 20 mm, and the crosshead speed was 50 micrometers per second. Load-time data were collected using LabVIEW (version 6.5, National Instruments) software. An acoustic-emission sensor (model SE2MEG-P, Dunegan Engineering Company) was used to detect the occurrence of crack events during the healed-specimen tests. Data from the acoustic-emission sensor were collected with a digital oscilloscope (model LC584A, LeCroy) and then were exported to a computer for correlation with the load-time data, to determine the load at which the first crack reopened. A few specimens from each set were not included in the averaging, due to inconclusive acoustic-emission signals or additional cracking of the coating.

Figure 5:
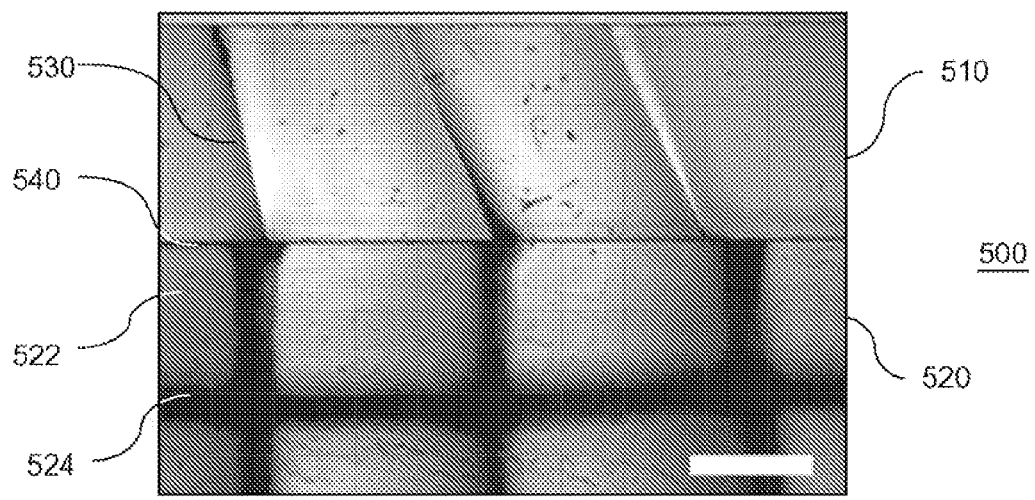
FIG. 5 is a high-magnification cross-sectional image of a composite with cracks in the polymeric layer.

In this fracture testing, the composite was loaded in four-point bending until crack initiation occurred at the surface of the coating, where the tensile stress was maximum. The resulting cracks were attracted to the more compliant regions of the substrate, created by the presence of fluid-filled microchannels. The cracks were then arrested at the coating-substrate interface. FIG. 5 is a high-magnification cross-sectional image of a composite with cracks in the coating. Composite 500 included polymeric layer (coating) 510 and substrate 520, which included substrate matrix 522 and microfluidic network 524. The cracks 530 initiated at the upper surface of the coating and propagated toward the microchannel openings at the coating-substrate interface 540. The scale bar in FIG. 5 is 0.5 mm.

Figure 6:
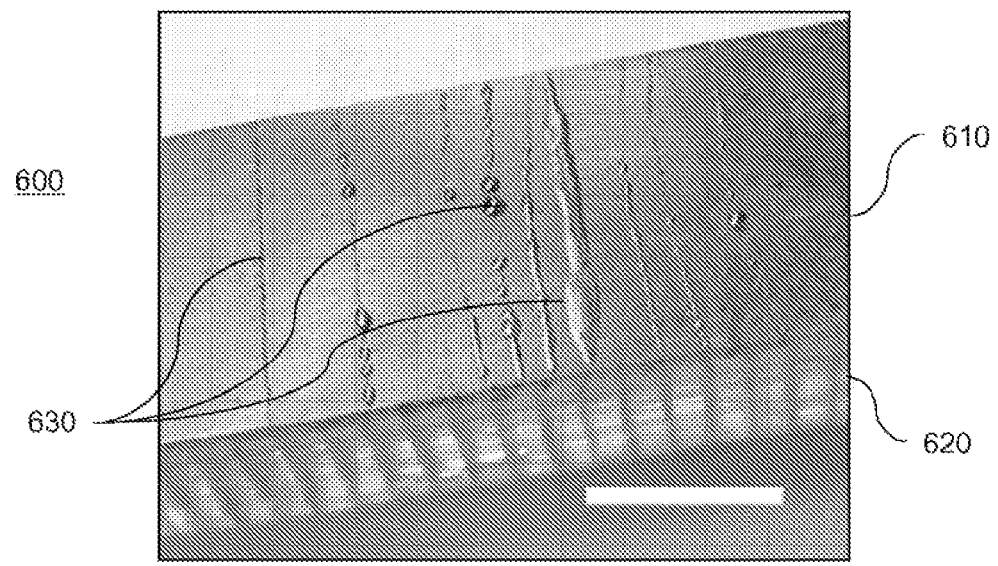
FIG. 6 is an optical image of a composite that has self-healed.

DCPD polymerizer in the microfluidic network wicked into the crack(s) through capillary action. Once in the crack plane, the DCPD contacts the catalyst particles in the coating, polymerizing and rebonding the crack faces autonomically. After a sufficient time period, the cracks were healed, and the structural integrity of the coating was restored. FIG. 6 is an optical image of a composite that had self-healed. In this composite, the coating included 2.5 wt % catalyst. Composite 600 included polymeric layer (coating) 610 and substrate 620. Excess DCPD 630 was present on the top of the coating, indicating that the release and delivery of the polymerizer was efficient. The scale bar in FIG. 6 is 5 mm.

For quantitative analysis of the fracture and self-healing behavior of the composites, the composite samples were loaded in the four-point bending configuration to initiate a single crack in the coating, without damaging the substrate. With each loading cycle, the same crack reopened and was subsequently healed repeatedly. An acoustic-emission sensor was placed on the composite to detect the crack opening events during testing. The time at which the critical acoustic-emission event occurred was used to determine the loads of crack formation and reopening in the virgin-specimen and healed-specimen tests. The composites were limited to a single crack by stopping the loading process after the first acoustic-emission signal was detected. In a small number of tests, new cracks did initiate in the coating during reloading. Specimens where additional cracks formed were not subject to further testing to enable more accurate comparisons between different healing cycles and specimens. After testing, the coating was healed at room temperature (approximately 25° C.) for 12 h. Any excess DCPD monomer was removed from the network by applying a light vacuum. The network was then replenished with monomer before carrying out the next bend test. This cycle was repeated until the crack no longer healed.

Figure 7:
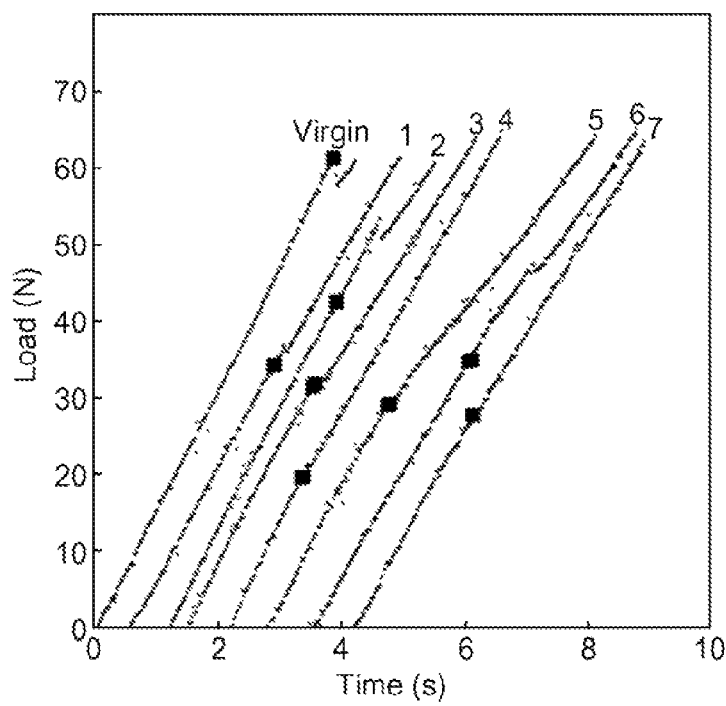
FIG. 7 is a graph of load data for virgin-specimen and healed-specimen tests.

The composites with high catalyst concentration (10 wt %) in the coating exhibited healing over the largest number of loading cycles. FIG. 7 is a graph of load data for virgin-specimen and healed-specimen tests for the best specimen, for composites having 10 wt % catalyst in the coating. The large squares denote the critical crack event for each type of specimen as detected by the acoustic-emission sensor. Loading traces were shifted 200-500 milliseconds to visualize each data set individually.

Figure 8:
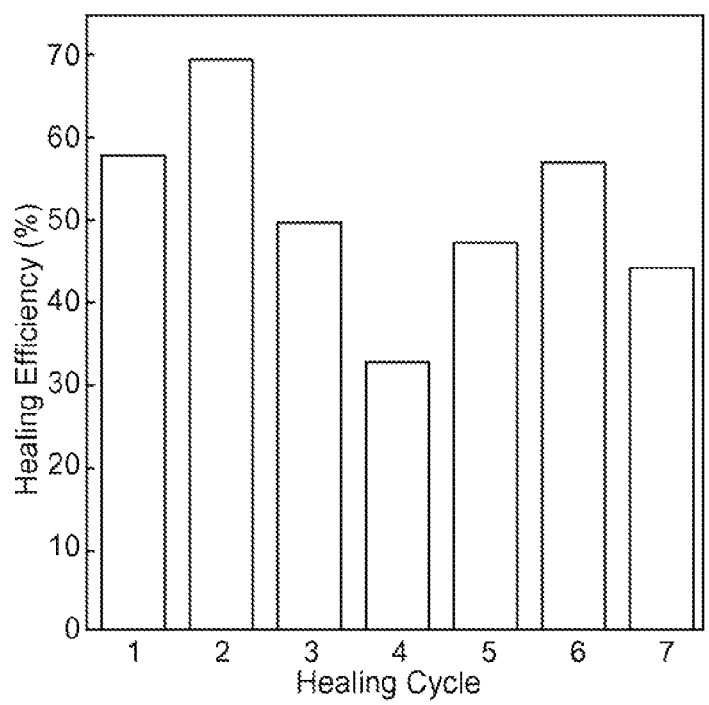
FIG. 8 is a graph of the healing efficiency for a composite, for a series of seven consecutive healing cycles for the same crack.

FIG. 8 is a graph of the healing efficiency for the same type of composite, as calculated for a series of seven consecutive healing cycles for the same crack. Healing efficiency was calculated for each healing cycle on the basis of the ratio of the critical loads for crack opening, $\eta = P_{Healed}/P_{Virgin}$, where $P_{Healed}$ is the applied load when the crack occurred for the healed sample, and $P_{Virgin}$ is the applied load when the crack occurred for the virgin sample. Some scatter in the data occurred from one cycle to the next, and the peak recovery (70%) was achieved after the second healing cycle. Beyond the seventh loading cycle, this specimen no longer healed.

Figure 9:
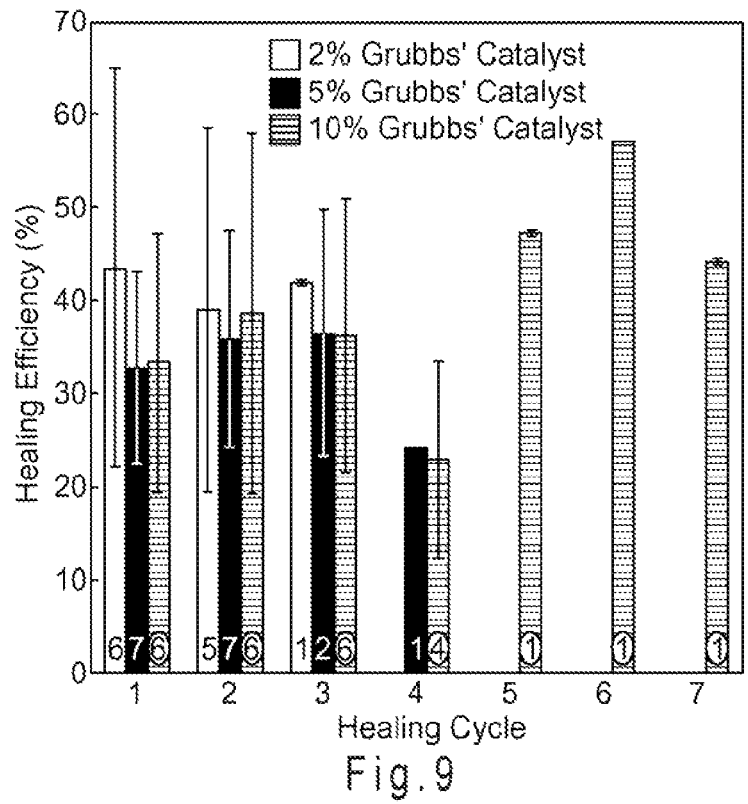
FIG. 9 is a graph of healing efficiency for composites having different levels of catalyst in the coating, for a series of seven consecutive healing cycles for the same crack.

FIG. 9 is a graph of healing efficiency for composites having different levels of catalyst in the coating, as calculated for a series of seven consecutive healing cycles for the same crack. The numbers just above the horizontal axis indicate the number of successfully healed specimens in the average, and the error bars are one standard deviation. The concentration of catalyst in the coating did not significantly influence the average healing efficiency achieved by specimens for a given cycle. However, the amount of catalyst had a pronounced impact on the number of successful consecutive healing cycles achieved. Specimens containing 2 wt % catalyst healed a maximum of three times, whereas specimens with 5 wt % catalyst healed no more than four times, compared with a maximum of seven cycles for specimens with 10 wt % catalyst. The average number of successful healing events for each set was two, three and four cycles for specimens with 2 wt %, 5 wt % and 10 wt % catalyst, respectively. Control specimens with 0 wt % catalyst did not heal. Because the Grubbs catalyst can undergo some deactivation on exposure to amines in the uncured epoxy coating material, the effective concentration of active catalyst may have been lower than the values noted.

Factors such as the reactivity, concentration and availability of Grubbs catalyst affected both the kinetics and the degree of polymerization of the DCPD in the crack plane. Scanning electron micrographs of these specimens revealed distinct differences in the coverage of polymerized DCPD on the crack surfaces. Typically, the fracture planes of composites with 2 wt % or 5 wt % catalyst contained small scattered patches of poly(DCPD) film, with localized regions of good coverage located near larger catalyst particles (approximately 500 micrometers). The poor coverage of poly(DCPD) on the crack surface was associated with a low number of successful healing cycles. More polymerized material covered the crack plane in coatings with the same catalyst concentration that exhibited healing over a larger number of cycles. In specimens with the highest catalyst concentration of 10 wt %, there was nearly complete coverage of the fracture plane with poly(DCPD) film in specimens. The large amount of healed material in the crack plane indicates a build-up of polymerized DCPD with each additional cycle of healing.

One possible explanation for the trends in self-healing performance is that the ability to achieve further healing events in these specimens was controlled by the availability of active catalyst in the coating. With each cycle of healing, less active catalyst was available, and eventually the healing efficiency was degraded when no more active catalyst was accessible, even though there was a continuous supply of monomer.

Example 5

Formation of Composites Including First and Second Microfluidic Networks

Direct-write assembly was used to embed a fully interconnected microfluidic network in an epoxy substrate matrix. The network was formed from a 3D scaffold, as described in Example 1, except that the syringe used to dispense the fugitive ink had a cylindrical nozzle with a diameter of 330 micrometers. The resulting 3D periodic scaffold had overall dimensions of 49.5 mm×9.9 mm×14 mm, and was composed of an array of 330 micrometer cylindrical rods with a center-to-center separation distance of 3.3 mm between each rod in a given layer. After infiltration with epoxy, curing the epoxy, removing the ink, and cutting and polishing, the substrate was approximately 45-50 mm long, 7-9 mm high, and 10-14 mm wide.

The microfluidic network was filled with an ultraviolet light-sensitive photopolymer (NOA 61, Norton Optical Adhesives). Opaque tape was used to mask the network so that only the bottom, front and back surfaces were uncovered. Using a microscope with a mercury source ($\lambda$=365 nm), the edges were exposed to UV light for 6-8 seconds for the height and width of the beam to cure the polymer. This served to selectively seal the bottom and sides of the substrate. In addition, the photopolymer was selectively polymerized along at least one vertical plane within the substrate. This served to create two or more separate networks that were not in fluid communication with each other as the channels between the networks were blocked by the cured polymer. The remaining uncured polymer was removed with a vacuum and channels were rinsed with acetone.

Example 6

Formation and Fracture Testing of Composites Including DCPD in a First Microfluidic Network and Catalyst in a Second Microfluidic Network Composites of Example 5 having two independent microfluidic networks were filled with DCPD monomer in one network, and with Grubbs catalyst in cyclohexane (1 wt %, 2.5 wt %, or 5 wt %) in the other network. Network filling was done by injection with a syringe, as described in Example 3. Fracture testing was performed as described in Example 4.

The composites were loaded to crack the coatings. For some of the tests, the specimens were flexed repeatedly (approximately 30-50 times) to promote mixing within the crack plane. The catalyst solution was exposed to air for less than ten minutes before testing was completed, to ensure reactivity of the catalyst for healing. The fluids were removed from the channels by light vacuum pressure, and the composite was allowed to heal for 24 hours at room temperature. The networks were refilled using syringes containing the catalyst solution and the DCPD monomer, and the composites were loaded in bending to reopen the cracks. This process was repeated for several cycles or until the specimen no longer healed.

To test the ability to heal without the need for mixing, a premixed solution of Grubbs catalyst in DCPD monomer (10 mg catalyst in 1 ml monomer) was used to heal cracks. Specimens with only one network were loaded until a crack formed, and the precatalyzed monomer was injected into the network until it reached the crack in the coating. Once fluid was present in the crack plane, the excess solution was quickly removed from the network. Coatings healed at 25° C. and were retested after 24 hours. Specimens healed with low efficiency (around 10-15%) for three or four cycles. The low efficiency and the limited number of cycles were both due to blocking of the network by polymerized monomer that could not be completely removed from the channels. The blockage restricted the flow of fluid in the channels to the cracks and also prevented additional solution from refilling the network.

Multiple healing cycles were possible at room temperature as long as sufficient mixing of the fluids occurred and the catalyst remained active.

A first set of self-healing composites was prepared with two independent networks in each composite, with one network containing DCPD monomer and the other network containing 2.5 wt % Grubbs catalyst in cyclohexane. After loading in bending, the cracks in the coatings were checked to see if fluid was present. Both fluids were viewed in the crack plane under the microscope. The fluids were left in the networks for 2 hours before removal, and the coatings were healed at 25° C. for 24 hours. The networks were recharged with fluid, the composites were reloaded, the cracks reopened immediately without a sound, and fluid refilled the cracks. The crack planes were inspected again after the fluids were removed from the channels and the cracks. Under the microscope, the region of the crack that was above the channels with catalyst solution had with partially polymerized material. Above the channels with DCPD, no material was seen in the crack plane. The material present in the crack plane was not fully polymerized.

A second set of self-healing composites was prepared with three or four independent networks in each composite, each network containing either DCPD monomer or Grubbs catalyst in cyclohexane. The increase in the number of networks was intended to increase the number of mixing interfaces for the two fluids. The catalyst solution and monomer were alternated in these specimens. Similar to the previous test, 2.5 wt % Grubbs catalyst in cyclohexane was used, but the fluids were removed immediately after testing, and the specimens were healed at 50° C. for 24 hours. The cracks had some polymerized material that partially healed the crack closed with low healing efficiency. For the first healing cycle, an audible sound was detected by the AE sensor upon reopening. In the second healing cycle, no signal was detected by the AE sensor, and no sounds were heard when the crack reopened. Polymerized material was present in the crack plane, but was likely too soft to properly heal the crack. The healing in this test showed that it was possible to achieve at least one healing event with the two fluid healing chemistry with catalyst and monomer.

Figure 10:
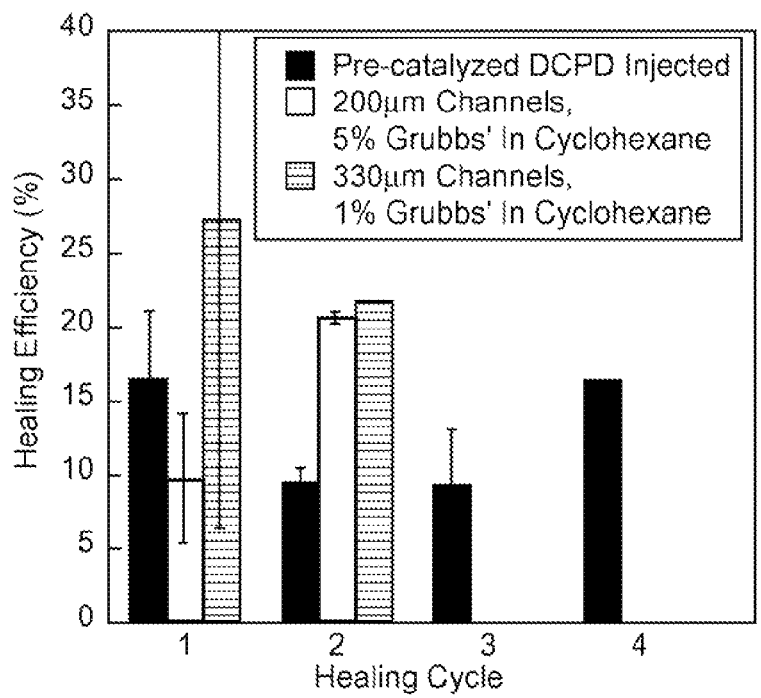
FIG. 10 is a graph of healing efficiency for composites having multiple networks containing DCPD monomer and Grubbs catalyst in solution.

FIG. 10 is a graph of healing efficiency for composites having multiple networks containing DCPD monomer and Grubbs catalyst in solution. Beams healed by injecting pre-catalyzed DCPD into the network achieved the most healing cycles on average. When Grubbs catalyst in solution and DCPD monomer were used in separate channels—either 200 micrometer channels with 5 wt % catalyst in solvent, or 330 micrometer channels with 1 wt % catalyst in solvent—the healing was limited to two healings at the most for the two cases listed, as well as most others. Many sets of specimens did not heal for any cycles. Three factors appeared to affect the number of successful healing cycles in these composites: (1) lower reactivity of the catalyst when in solution, (2) the mixing of fluids in the crack plane, and (3) the partial blocking of channels in the networks by solidified catalyst.

Example 7

Formation and Fracture Testing of Composites Including Epoxy Precursor in a First Microfluidic Network and Catalyst in a Second Microfluidic Network Composites of Example 5 having two independent microfluidic networks were filled with epoxy precursor in one network, and with a catalyst in the other network. Network filling was done by injection with a syringe, as described in Example 3. Fracture testing was performed as described in Example 4. The formulations are listed in Table 1. Each epoxy precursor included bisphenol-A. The EPON 813 included cresyl glycidylether as a diluent, the EPON 8132 included aliphatic glycidylether as a diluent, and the EPON 815c included butyl glycidylether as a diluent. The ANCAMIDE 2349 included tetraethylenepentamine and bisphenol, the ANAMIDE 503 included TEPA and its reaction products, the EPICURE 3274 included poly[oxy(methyl-1,2-ethanediyl)] and nonyl phenol, and the EPICURE 3046 included ethanediamide and triethylenetriamine.

TABLE 1

Epoxy Formulations

| Formulation | Epoxy precursor | Catalyst | p.p.h. catalyst |
|---|---|---|---|
| I | EPON 813 | ANCAMIDE 2349 | 36.4 |
| II | EPON 813 | ANCAMIDE 503 | 48 |
| III | EPON 813 | EPICURE 3274 | 40.5 |
| IV | EPON 8132 | ANCAMIDE 503 | 44.4 |
| V | EPON 8132 | EPICURE 3046 | 44.4 |
| VI | EPON 815c | EPICURE 3046 | 48 |

Control specimens containing only curing agent in the channels were tested for chemistries II and V. Coatings on substrates with a single network were prepared in an identical fashion to self-healing specimens; however, before the virgin test the network was filled with curing agent using a syringe. After crack formation, the coatings were healed at 30° C. for 48 hours. The network was refilled with curing agent and the first heal test was performed. Four healing cycles were conducted in total. One specimen from each chemistry healed for the first cycle, but the subsequent cycles did not heal. Exposing the faces of the crack to additional curing agent during the first healing period may have caused additional cross-linking across the crack plane of the under-cured epoxy coating. After healing at 30° C. for 48 hours, the crack was partially healed. Subsequent loading reopened the crack with an audible sound detected by the AE sensor for two of the four specimens. No additional healing cycles were successful. One possible explanation for this is that the coating was more fully cured after the heal period, and there was less under-cured epoxy available for crosslinking.

Preliminary self-healing tests were conducted using the six combinations listed in Table 1. Two specimens for each chemistry combination were prepared using substrates having four independent microfluidic networks with 330 micrometer diameter channels. Using syringes, the networks were manually filled with the epoxy precursor and catalyst in an alternating pattern. Specimens were loaded in bending to forms cracks in the coatings. After a 24-hour heal period the composites were loaded in bending to reopen the cracks. This cycle was repeated six times in total. The first five healing cycles were conducted at 25° C., but for the sixth cycle the temperature was increased to 35° C. The epoxy precursor and catalyst were left in the channels for the first four healing cycles, after which the fluids were removed between tests.

Figure 11:
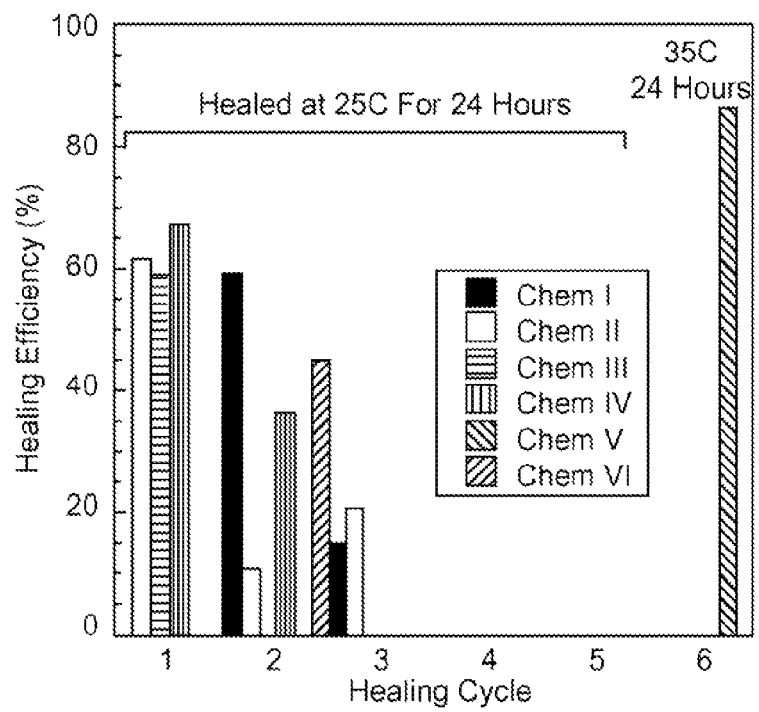
FIG. 11 is a graph of healing efficiency for composites having multiple networks containing epoxy precursor and catalyst.

FIG. 11 is a graph of healing efficiency for composites using the six epoxy-catalyst combinations. The initial loading of the beams produced multiple cracks in the coatings, possibly due to over-curing. Each chemistry combination performed differently with each healing cycle. Combinations III and VI each healed for a single cycle that was the first or second testing cycle, respectively. Two consecutive healing cycles were achieved with combinations I and IV. Specimens with chemistry I did not heal for the first cycle, but did heal in the second and third cycles. Combination II healed for three cycles. After the third heal test, all the specimens appeared to have stopped healing until the sixth cycle that was healed at an elevated temperature. After healing at 35° C., the specimens with combination V healed with high efficiency, while no other specimens healed in this final cycle.

Inspection of the crack planes under SEM revealed polymerized material on the crack planes. The material did not form a distinct film as with the Grubbs catalyst and DCPD monomer specimens, but instead appeared textured on the smooth, virgin fracture surface. In general for all chemistries, the healed material on the crack planes did not fully cover the entire width of the crack, but was localized in regions were the two fluids were in contact. The healed material on the crack faces of these specimens was located above the channels that supplied the resin to the crack plane.

The next series of tests were conducted on only the best four of the healing chemistry combinations from the first set of tests: II, III, IV, and V. In the virgin tests, the specimens were loaded until only one crack formed in the coating, although a few specimens developed multiple cracks. Substrates with four networks were prepared with neat coatings. After testing, the fluids were removed from the networks, and the coatings healed at 25° C. for 24 hours.

Figure 12:
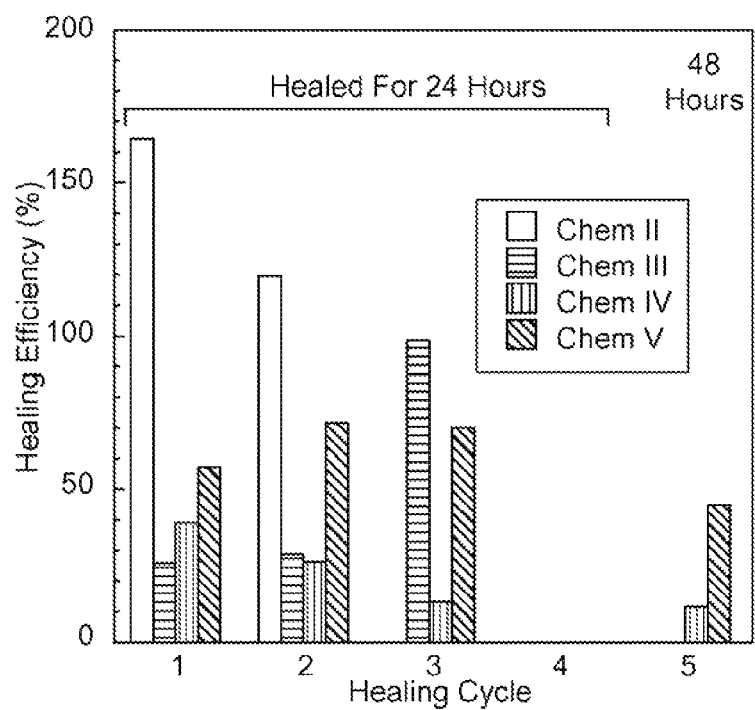
FIG. 12 is a graph of healing efficiency for composites having multiple networks containing epoxy precursor and catalyst.

FIG. 12 is a graph of healing efficiency for composites using these four epoxy-catalyst combinations. Most specimens healed for three cycles, and none healed in the fourth cycle. The healing time was increased to 48 hours for the fifth cycle resulting in an additional healing cycle for two of the chemistries (IV and V). The magnitudes of the healing efficiencies (over 100% in some cases) for the different tests varied greatly. Specimens were prepared separately and variations in the mixing, cure temperature and cure time caused variations in the virgin fracture toughness between sets. The different values of the virgin fracture toughness affected the healing efficiency calculation in which the healed fracture toughness was normalized by the virgin toughness. The number of healing cycles was the most relevant factor in judging the performance of these specimens.

One possible explanation for the limited number of healing cycles in the first and second sets of specimens is that the material that formed in the crack planes was not fully cured after just 24 hours at 25° C. Although three healing cycles was initially the limit, when given additional heat or time to heal, the specimens continued to heal. To improve the number of healing cycles achieved, the healing conditions were changed to 30° C. for 48 hours to accelerate polymerization of the two healing fluids. In addition, flexing of the composite after crack formation could improve the healing efficiency and the number of healing cycles, due to mechanical mixing of the epoxy precursor and the catalyst.

While various embodiments of the invention have been described, it will be apparent to those of ordinary skill in the art that other embodiments and implementations are possible within the scope of the invention. Accordingly, the invention is not to be restricted except in light of the attached claims and their equivalents.

REFERENCES

1. Anderson et al., *Anal. Chem.* 74, 3158-64 (2000).
2. Bautista, F. et al., *Journal of Non-Newtonian Fluid Mechanics*, Vol. 80, 1999, pp. 93-113.
3. Bazan et al., *Macromolecules* 24, 4495-4502 (1991).
4. Chen, X. et al., *Science* 295, 1698-1702 (2002).
5. Chen, X. et al., *Macromolecules* 36, 1802-1807 (2003).
6. H. Fan et al., *Nature*, Vol. 405, pp. 56-60 (2000).
7. Grubbs et al., *Tetrahedron* 54, 4413-4450 (1998).
8. Mas, R. et al. *Journal of Rheology*, Vol. 38, No. 4, 1994, pp. 889-908.
9. Smay, J. E. et al., *Langmuir*, 18, 5429-37 (2002).
10. Stevens et al., *Polymer Chemistry: An Introduction, 3rd Edition*; (Oxford University Press, New York, (1999)), 184-186; 378-381.
11. U.S. Pat. No. 6,027,326 to Cesarano III et al., issued Feb. 22, 2000.
12. U.S. Pat. No. 6,518,330 to White et al., issued Feb. 11, 2003.
13. U.S. Patent Application Publication 2004/0226620 A1 to Therriault et al., published Nov. 18, 2004.
14. U.S. Patent Application Publication 2006/0252852 A1 to Braun et al., published Nov. 9, 2003.
15. U.S. patent application Ser. No. 11/620,276 with inventors Braun et al., filed Jan. 5, 2007.
16. U.S. patent application Ser. No. 11/756,280 with inventors White et al., filed May 31, 2007.

What is claimed is:

1. A method of making a composite material,
    the composite material comprising a polymeric layer and a substrate, in contact with the polymeric layer,
        where the substrate comprises a substrate matrix, a first microfluidic network in the substrate matrix and in fluid communication with the polymeric layer, and a polymerizer in the first microfluidic network;
    the method comprising:
    forming the first microfluidic network in the substrate matrix,
        where the first microfluidic network comprises a plurality of channels surrounded in the substrate matrix, and
        at least a portion of the channels have an end that is open to a surface of the substrate matrix;
    contacting the surface of the substrate matrix with the polymeric layer,
        where the polymeric layer closes the ends of the channels that were open to the surface; and
    placing the polymerizer in the first microfluidic network.

2. The method of claim 1, where
    the polymeric layer comprises a corresponding activator for the polymerizer, and
    the contacting comprises contacting the surface of the substrate matrix with the polymeric layer comprising the corresponding activator for the polymerizer.

3. The method of claim 2, where the contacting the surface comprises
    combining the corresponding activator with a polymeric layer precursor to form a mixture,
    applying the mixture to the surface of the substrate matrix, and
    solidifying the polymeric layer precursor to form the polymeric layer.

4. The method of claim 1, where the contacting the surface comprises
    applying a polymeric layer precursor to the surface of the substrate matrix, and
    solidifying the polymeric layer precursor to form the polymeric layer.

5. A method of making a composite material,
    the composite material comprising a polymeric layer and a substrate, in contact with the polymeric layer,
        where the substrate comprises a substrate matrix;
        a first microfluidic network in the substrate matrix and in fluid communication with the polymeric layer, and a polymerizer in the first microfluidic network; and a second microfluidic network in the substrate matrix, and a corresponding activator for the polymerizer in the second microfluidic network and in fluid communication with the polymeric layer;

the method comprising:

forming the first microfluidic network in the substrate matrix;

forming the second microfluidic network in the substrate matrix;

where the first and second microfluidic networks each comprise a plurality of channels surrounded in the substrate matrix, and at least a portion of the channels have an end that is open to a surface of the substrate matrix;

contacting the surface of the substrate matrix with the polymeric layer, where the polymeric layer closes the ends of the channels that were open to the surface;

placing the polymerizer in the first microfluidic network; and placing the corresponding activator in the second microfluidic network.

* * * * *